(12) United States Patent
Malik et al.

(10) Patent No.: US 8,709,705 B2
(45) Date of Patent: Apr. 29, 2014

(54) METAL-CONTAINING COMPOSITIONS AND METHOD OF MAKING SAME

(75) Inventors: Mangala Malik, Attleboro, MA (US); Joseph J Schwab, Hattiesburg, MS (US)

(73) Assignee: Pryog, LLC, Attleboro, MA (US)

( * ) Notice: Subject to any disclaimer, the term of this patent is extended or adjusted under 35 U.S.C. 154(b) by 0 days.

(21) Appl. No.: 13/543,071

(22) Filed: Jul. 6, 2012

(65) Prior Publication Data

US 2012/0315451 A1 Dec. 13, 2012

Related U.S. Application Data

(63) Continuation-in-part of application No. 12/979,722, filed on Dec. 28, 2010, which is a continuation of application No. 11/792,738, filed as application No. PCT/US2005/044670 on Dec. 9, 2005, now Pat. No. 7,888,441, application No. 13/543,071, which is a continuation-in-part of application No. 12/737,694, filed as application No. PCT/US2009/003841 on Jun. 27, 2009.

(60) Provisional application No. 60/634,890, filed on Dec. 13, 2004, provisional application No. 61/188,182, filed on Aug. 7, 2008.

(51) Int. Cl.
G03F 7/26 (2006.01)

(52) U.S. Cl.
USPC .......................................... 430/322; 430/330

(58) Field of Classification Search
USPC .......................................... 430/311, 322, 330
See application file for complete search history.

(56) References Cited

U.S. PATENT DOCUMENTS

| | | | |
|---|---|---|---|
| 2,502,411 A | 4/1950 | Neher et al. | |
| 3,264,272 A | 8/1966 | Rees | |
| 3,379,702 A | 4/1968 | Spivey | |
| 3,672,942 A | 6/1972 | Neumann et al. | |
| 3,705,137 A | 12/1972 | Kuwahara et al. | |
| 4,022,960 A | 5/1977 | Mima et al. | |
| 4,129,524 A | 12/1978 | Nagai et al. | |
| 4,429,094 A * | 1/1984 | Massucco | 526/240 |
| 4,585,841 A | 4/1986 | Eguchi et al. | |
| 4,608,409 A | 8/1986 | Coady et al. | |
| 5,064,877 A | 11/1991 | Nass et al. | |
| 5,159,035 A | 10/1992 | Evani | |
| 5,484,867 A | 1/1996 | Lichtenhan et al. | |
| 5,559,200 A | 9/1996 | Suzuki et al. | |
| 5,664,041 A | 9/1997 | Szum | |
| 5,856,415 A | 1/1999 | Lagace et al. | |
| 6,194,504 B1 | 2/2001 | Nagel et al. | |
| 6,291,070 B1 | 9/2001 | Arpac et al. | |
| 6,432,526 B1 * | 8/2002 | Arney et al. | 428/328 |
| 6,553,169 B2 | 4/2003 | Fabian | |
| 6,656,990 B2 | 12/2003 | Shustack et al. | |
| 6,844,950 B2 | 1/2005 | Ja Chisholm et al. | |
| 6,846,572 B2 | 1/2005 | Yamaguchi et al. | |
| 7,083,831 B1 * | 8/2006 | Koch et al. | 427/515 |
| 2002/0082323 A1 | 6/2002 | Chawla et al. | |
| 2003/0059544 A1 | 3/2003 | Bravo-Vasquez et al. | |
| 2003/0073042 A1 | 4/2003 | Cernigliaro et al. | |
| 2004/0026258 A1 * | 2/2004 | No et al. | 205/159 |
| 2004/0164293 A1 | 8/2004 | Maloney et al. | |
| 2004/0171743 A1 | 9/2004 | Flaim et al. | |
| 2005/0131175 A1 | 6/2005 | Weck et al. | |
| 2007/0075628 A1 | 4/2007 | Lewis et al. | |
| 2007/0287747 A1 | 12/2007 | Finmans et al. | |
| 2008/0083299 A1 | 4/2008 | Simone et al. | |
| 2008/0150184 A1 | 6/2008 | Chiruvolu et al. | |

FOREIGN PATENT DOCUMENTS

| | | |
|---|---|---|
| JP | 56-147101 A | 11/1981 |
| JP | 57-028116 A | 2/1982 |
| WO | WO 00-69978 | * 11/2000 |

OTHER PUBLICATIONS

E. Bryan Coughlin, "Silsesquioxane based Inorganic Organic Hybrid Copolymers".
"Brewer Science Offers Novel High Refractive Index Polymers"— www.brewerscience.com.
Yubao Wang et al., "Hybrid high refractive index polymer coatings".
Henry W. Oviatt, "Polyhedral Oligomeric SilSesquioxane (POSS) Fillers as Refractive Index Enhancers for Silicone Intraocular Lenses, 18-9333".
D. Skrtic et al., "Dental composites based on hybrid and surface-modified amorphous calcium phosphates", Biomaterials 25 (2004), pp. 1141-1150.
D. Skrtic et al., "Volumetric contraction and methacrylate conversion in photo-polymerized amorphous calcium phosphate/methacrylate composites", Biomaterials 24 (2003).
Schubert et al., "Inorganic-Organic Hybrid Polymers from Surface-Modified Oxometallate Clusters", Mat. Res. Soc. Symp. Proc. (2000) vol. 628, CC2.3.1-CC2.3.11.
International Search Report for International Application No. PCT/US05/44670 dated Jun. 26, 2006.
International Search Report for International Application No. PCT/US06/22885 dated Feb. 12, 2008.
International Search Report for International Application No. PCT/US09/03841 dated Nov. 13, 2009.

* cited by examiner

Primary Examiner — Brittany Raymond
(74) Attorney, Agent, or Firm — Alix, Yale & Ristas, LLP

(57) ABSTRACT

The present invention relates to a process for forming metal-containing films by applying a photosensitive metal-containing composition on a substrate, drying the photosensitive metal-containing composition, exposing the photosensitive metal-containing composition to a source of actinic radiation and applying a post-treatment to the metal-containing composition. The process also includes exposing the photosensitive metal-containing composition to a source of actinic radiation through a mask or mold and developing the unexposed portion of the composition. Another embodiment of the invention is a metal-containing film, three-dimensional object or article formed by the process. The invention is useful in producing a directly patterned metal-containing film and a microdevice.

34 Claims, No Drawings

METAL-CONTAINING COMPOSITIONS AND METHOD OF MAKING SAME

RELATED APPLICATIONS

This application is a continuation-in-part of U.S. application Ser. No. 12/979,722 filed Dec. 28, 2010, which is a continuation of U.S. application Ser. No. 11/792,738 filed Jun. 12, 2007, now U.S. Pat. No. 7,888,441, which is the national phase of International Application No. PCT/US05/44670 filed Dec. 9, 2005, which claims priority based upon U.S. Provisional Application No. 60/634,890 filed on Dec. 13, 2004. This application is also a continuation-in-part of copending U.S. application Ser. No. 12/737,694 filed Apr. 15, 2011, which is the national phase of International Application No. PCT/US2009/003841 filed Jun. 27, 2009, which claims priority based upon U.S. Provisional Application No. 61/188,182 filed Aug. 7, 2008.

FIELD OF THE INVENTION

This invention relates to metal-containing compositions useful in manufacturing films and other articles with enhanced refractive index, optical clarity, thermal properties, chemical resistance, scratch resistance, adhesion and surface hardness. Such films and articles find applications in the area of light management films, articles and devices.

BACKGROUND TO THE INVENTION

Polymeric films and articles are extensively used in optical applications. One major problem with the use of such materials is reflective losses at the substrate/air interface, resulting in lower intensity of transmitted light. Issues of reflective losses across multiple interfaces can be addressed by adjusting the refractive indices of the films. One such example is cured film of urethane acrylate resin, which is widely used as protective coat in variety of applications involving display devices. Although, urethane protective coats have excellent transparency, hardness and scratch resistance, it is difficult to modify their refractive indices due to limited choices of building materials that are available for optical applications. An alternative means of modifying refractive index is to use small amounts of miscible additives, which do not alter other fundamental properties such as transparency, hardness and scratch resistance.

High refractive index values of metal compounds make them ideal candidates as additives to boost refractive indices of organic polymeric materials. For instance, Arpac et al in U.S. Pat. No. 6,291,070 describe use of several nanoscale inorganic particles to create molded articles of varying refractive indices. Practical utility of inorganic particles in boosting refractive index is greatly restricted by the limited compatibility between such particles and organic polymeric matrices. Processes such as "micronization" can produce nanoparticles with relatively high dispersion to some extent but there is a practical limit to the size achievable economically by "micronization". For applications where transparency is important, the particle size must be smaller than the wavelength of the light in order for the material to be transparent. Sol-gel or solution-colloidal phase reactions are alternative means of generating very fine particles of metal oxides, but the nature of the small particles often leads to their agglomeration, causing increased hazing and scattering of a transparent article over time.

Issues of agglomeration of fine particles can be addressed through chemical surface reactions. For instance, inorganic particles, described by Arpac et al. in U.S. Pat. No. 6,291,070, were surface-treated with hydrolysable silane containing at least one polymerizable and/or polycondensable group. Chisholm et al. in U.S. Pat. No. 6,844,950 also describe the use of nanoparticles of ethylenically unsaturated compounds of zirconium and titanium. Similarly, Arney et al. in U.S. Pat. No. 6,432,526 describes the use of metal oxides modified with dispersing aids for improved compatibilization with organic materials. The main difficulty with this approach is that the actual nanoparticle compositions are changed by attaching these modifying species to them. Moreover, the metal concentration in any subsequent formulations is decreased by the presence of these organic functional groups. Most critically, the issues of hazing and light scattering after the article has been exposed to prolonged storage are not completely solved due to the limited shelf life of surface modified metal particles. Designing metal-containing compositions with homogeneous dispersion in the final article or the polymerizable fluid and long shelf life stability, therefore, continues to be a challenge.

Use of discrete metal compounds as processing aids and curing agents in the processing of certain types of elastomers and some dental compositions is known. For instance, Nagel et al in U.S. Pat. No. 6,194,504 describe the use of metal salts of acrylic acid as processing aids to improve dispersion of such curing additives in butadiene, natural rubber and EPDM based elastomers. Fabian in U.S. Pat. No. 6,553,169 and Shustack et al. in U.S. Pat. No. 6,656,990 describe the use of less than 0.5 weight-percent of titanates and zirconates as energy curable coupling agents to improve adhesive properties and dispersion of pigments. Similarly, use of zirconium-based acrylate as coupling agent between amorphous calcium phosphate and polymeric matrices has been reported by Skrtic et al [Biomaterials 24 (2003) 2443-2449]. None of the art reported above teaches how to create an optically clear film or article with excellent physical and mechanical properties, especially ones with high refractive index, and improved shelf life from compositions containing discrete metal-containing functional precursor units.

Conventional methods of patterning into metal-based substrates involve complex multi-step processes including deposition of the nascent metal-compounds on suitable substrates and patterning into such compounds.

Techniques commonly employed to deposit metals or metal oxides are spin-on deposition of metal precursor (sol-gel), evaporation, sputtering, and chemical vapor deposition (CVD). Each of these techniques has several limitations and hence has so limited commercial viability.

Sol-gel is one of the most common methods of depositing a metal oxide layer. The method employs spin-on coating of a sol precursor dissolved in a suitable solvent followed by heating the substrate to a high temperature to convert the precursor film into metal oxide. The method is not very practical in the sense that it employs quite high temperatures. High stresses related to cycles of heating and cooling involved in the process lead to defectivity. Moreover, additional processing steps are required to pattern small features into the material.

Deposition by evaporation involves heating of metal-compound to be deposited to high temperatures. Vapors of such materials are condensed on the substrate under vacuum using a screen or shadow to form fine patterns of the material. Deposition by evaporation has limited commercial potential due to high temperatures and high vacuum requirements.

Deposition by sputtering involves vaporization of the material to be deposited by bombarding with high-energy atomic radiation. Similar to Evaporation, the vapors of the materials can be deposited on the substrate by condensation. Utility of the process is limited due to high energy requirements and lack of precision in controlling film properties.

The process of deposition by CVD is even more expensive than sputtering or evaporation due to additional costs associated with the specialized equipment required for the chemical reactions prior to material deposition.

Formation of fine patterns into such metal-containing layers is achieved by additional multiple steps of imaging and etching of a photosensitive film deposited on such materials. First a photoresist or photosensitive film is applied on the metal-containing layer and dried at an appropriate temperature to remove a majority of casting solvent followed by image-wise exposure to actinic radiation to which such photoresist material is sensitive In case of a positive acting photoresist, the exposed area of the film undergoes chemical reaction rendering it soluble in an alkaline developer. The action of developer leaves behind a fine pattern of the photoresist material. In the case of a negative acting photoresist, the exposed portion of the film undergo chemical reaction rendering it insoluble in a solvent suitable for removing unexposed area of the film, leaving behind a fine pattern of the photoresist film, which acts as an etch mask to transfer pattern into underlying metal-containing material.

Another method of forming fine patterns involves depositing a non-photosensitive metal-containing film into a patterned substrate. The non-photosensitive metal-containing film is etched back to resolve the underlying pattern.

The techniques of metal-compound deposition as well as patterning are cumbersome and expensive. Ultra high purity materials are required for successful deposition. Moreover, the resolution of the pattern formed by some of the techniques is quite limited. Therefore, methods involving direct patterning into metal-containing layers are desired.

A photoresist-free, negative-tone method of direct patterning into metal-containing materials is described in U.S. Pat. Nos. 5,534,312; 6,071,676 and 6,972,256. The metal complex used in the method is photosensitive and undergoes low-temperature reaction in the presence of light of particular wavelength rendering the exposed portion insoluble in solvent/developer. Disadvantages of this method include limited choices of the starting metal-containing materials which demonstrate a sharp switch in solubility behavior upon exposure requiring very high exposure doses and often treatment of harsh solvents to remove unconverted material. Such harsh solvents also attack the exposed area, destroying pattern fidelity. This technique involves metal compounds that show significant absorbance at the exposure wavelength. High absorbance at the film surface leads to less light penetration into the bulk of the film resulting in non-uniform photochemical reaction; hence, chemical composition of the film is quite heterogeneous across the film.

More recently, Hill et al in U.S. Pat. No. 7,176,114, describe positive-tone pattern formation into metal-containing precursor layers. Materials used in the positive-tone method show sharper solubility contrast between the exposed and un-exposed areas of the film. However, most of the disadvantages noted with the negative tone-methods such as requirement of high energy dose and high exposure times make this method less pragmatic for real production environment.

SUMMARY OF THE INVENTION

An objective of this invention is to provide novel metal-containing compositions. They are produced by combining discrete metal-containing functional precursor units. The metal-containing functional precursor units are soluble in organic solvents in which the prepolymers are also soluble. A further objective of this invention is to provide processes for combining these compositions reactively so as to produce films or articles. The metal-containing compositions of this invention are especially useful to produce films or articles with excellent optical clarity and shelf life stability.

An objective of the embodiments disclosed herein is to provide a process of forming metal-containing films, three dimensional objects or articles. The metal compounds of the disclosed embodiments are readily soluble in commonly used solvents for coating applications and can be applied conveniently by any known coating method. The metal compounds used in the disclosed embodiments are generally transparent at the exposure wavelength, leading to a more efficient photochemical reaction. Photosensitivity to such metal-containing compositions is predominantly imparted and controlled by adding a photoactive compound that acts as a photoinitiator or photoactive catalyst. Through the use of a post-treatment, the metal-containing film composition can be tuned. The process described herein is also useful in directly applying high dielectric constant (k) materials such as hafnium- and zirconium-based metal compositions. Thus it is possible to replace silicon dioxide (k of about 4) with a high-k material such as hafnium or zirconium oxide gates using a convenient and low-cost process described herein.

Another objective of the embodiments disclosed herein is to provide a process of forming direct patterning of metal compounds using photosensitive compositions. Moreover, the patterning process of the embodiments described herein utilizes well known techniques of lithography, amenable to high throughput manufacturing. Through the use of a post-treatment, the patterned metal-containing film composition can be tuned as well as the refractive index. The process described herein is also useful in directly patterning high dielectric constant (k) materials such as hafnium- and zirconium-based metal compositions. Thus it is possible to replace silicon dioxide (k of about 4) with a high-k material such as hafnium or zirconium oxide gates using a convenient and low-cost process described herein.

Another objective of the disclosed embodiments is to provide a process for the production of metal-containing patterned films and three-dimensional objects or articles for protective, insulating and antireflective properties.

In one embodiment this invention provides a composition formed by combining compounds comprising a metal-containing precursor unit (MU), a prepolymer unit (PU), and a catalyst or an initiator capable of inducing a combining reaction of ethylenically unsaturated groups of MU and PU. The compositions are optically clear as measured by the Transmittance Test. The compositions are useful in enhancing refractive index and yield films, composites, and other articles with excellent thermal properties, chemical resistance, scratch resistance, adhesion, and surface hardness.

The metal-containing precursor unit (MU) of this invention can be of two types: MU1 and MU2. They can be used alone or in combination. MU1 and MU2 contain at least one ethylenically unsaturated functional group. MU2 is a polyhedral oligometallasilasesquioxane (POMSS) as defined below, and MU1 is represented by Structure I:

$$MA_wB_xC_y \qquad \text{Structure I}$$

where M comprises a metal with formal valency of 0-5 such as Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y. The A, B, and C groups may be selected to impart compatibility with a variety of prepolymers and organic solvents and to form an optically clear film or article. Here w is 1-5, and x is 0-4, and y is 0-4 such that w+x+y equals 1-5

A comprises

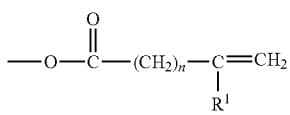

Structure II where $R^1$ is a H atom, an alkyl group containing 1-8 carbon atoms, a group containing a halogen atom, or a hydroxyalkyl group, and n is 0-6. Examples of A in MU1 are shown in Structures IIA, IIB, and IIC

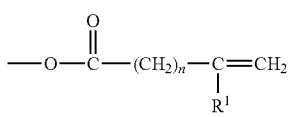

Structure IIA

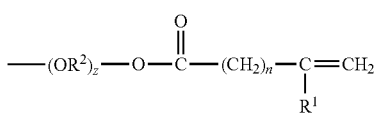

Structure IIB

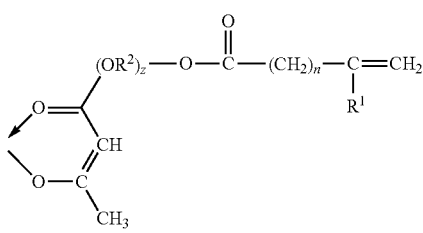

Structure IIC where $R^1$ represents a H atom, an alkyl group containing 1-8 carbon atoms, a group containing a halogen atom, or a hydroxyalkyl group; $R^2$ represents an alkyl group, or a substituted or unsubstituted aryl group; z is 1-3; and n is 0-6 (where 0 denotes a direct bond).

B and C in Structure I can be selected individually or in combination from oxygen, sulfur, a halogen atom, or —$OR^3$ where $R^3$ represents an alkyl group, an alkenyl group, an alkyl ether group, an aminoalkyl group, a haloalkyl group, or a thioalkyl group, or a substituted or unsubstituted aryl group.

An example of MU1 can be $Zr(O)(CH_2CO_2C(CH_3))_2$, zirconyl dimethacrylate, in which case A is methacrylate, B is oxygen, w=2, x=1, y=0, and w+x+y=3.

The POMSS materials, MU2, are cage-compounds comprising Si, O and metal atoms. Typically, POMSS compounds comprise both metal oxides and silicon oxides. They are represented by Structure III and Structure IV, respectively:

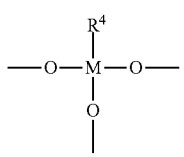

Structure III

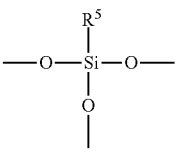

Structure IV where M is a four-coordinate metal, $R^4$ and $R^5$ independently represent an alkyl group, is an alkyl ether group, a group containing a halogen atom, a substituted or unsubstituted silyl group, a substituted or unsubstituted aryl group, a substituted or unsubstituted aryl ether group, a hydroxyl group, a thiol group, a carboxylic group, an amino group, or an ethylenically unsaturated functional group such as a (meth)acryloyl group, a substituted or unsubstituted styryl group, a vinyl group, or an allyl group. $R^4$ and $R^5$ groups are selected to contain at least two ethylenically unsaturated functional groups if used individually or at least one ethylenically unsaturated functional group if used in combination with MU1.

The term prepolymer unit (PU) refers to a monomer unit or an oligomer, where oligomer refers to a combination of monomer units joined together. The prepolymer may contain many monomeric units and is capable of further reactions to be incorporated in the final material. The PU contains terminal and/or pendant ethylenically unsaturated groups, which can participate in combining reactions, with metal-containing precursor units (MU). Examples of such terminal and pendant groups are a vinyl group, an allyl group, and a (meth)acryloyl group. The monomer units of the PU may be selected to be compatible with MU and to form an optically clear film or article. The average molecular weight of the PU is between 70 and $10^7$ Daltons. An example of PU can be diurethane dimethacrylate supplied by Aldrich Chemical Company (Catalog No. 436909).

Another embodiment is a composition comprising MU, PU and a catalyst or an initiator capable of inducing a combining reaction of ethylenically unsaturated groups of the MU and the PU, wherein the composition, after reaction, is optically clear as measured by the Transmittance Test. An important criterion in the selection of the MU and the PU for the metal containing composition of this invention is that they are compatible with each other, that is, they are capable of undergoing a combining reaction with each other and the composition forms an optically clear film or article as measured by the Transmittance Test.

The catalyst or initiator used in the composition is a compound capable of catalyzing combining reactions of the MU and the PU, usually in the presence of added light or heat. An example of photoinitiator is 1-hydroxy-cyclohexyl-phenyl-ketone, (Irgacure 184) from Ciba Specialty Chemicals.

The composition may further include a non-aqueous solvent and/or an additive. The composition may further comprise a co-monomer with only one ethylenically unsaturated functional group.

In another embodiment, this invention provides compositions comprising metal-containing precursor unit (MU) and a catalyst or an initiator capable of inducing combining reactions of ethylenically unsaturated groups of MU units to form an optically clear film or article. MU1 and MU2 can be used alone or in combination with the proviso that at least a portion of MU contains at least two ethylenically unsaturated functional groups.

The present invention also includes a method of forming a composition comprising preparing a mixture comprising a metal containing precursor unit (MU), a prepolymer unit (PU), and a catalyst/initiator under conditions sufficient to induce a combining reaction of ethylenically unsaturated groups of MU and PU. Another embodiment is a method of forming a composition comprising preparing a mixture comprising MU and a catalyst or initiator under conditions sufficient to induce a combining reaction of ethylenically unsaturated groups of MU units. A further embodiment is a method of making an article comprising preparing a mixture comprising MU, PU and a catalyst or initiator under conditions sufficient to induce a combining reaction of ethylenically unsaturated groups of MU and PU. Another embodiment is a method of making an article comprising preparing a mixture comprising MU and a catalyst or initiator under conditions sufficient to induce a combining reaction of ethylenically unsaturated groups of MU units.

The formulations of this invention are stable i.e. they do not show any sign of separation for at least 2 months upon storage at room temperature (23° C.). In contrast compositions containing metal oxides as fine particles are not stable.

The invention also provides a method of using the composition to form an optically clear film or article. The film can be part of a laminate.

The invention further includes a coated, a laminated, or a molded article formed by the composition. The composition and the film, or the laminate or the molded article formed therefrom usually has an index of refraction in the range of 1.4 to 1.8 in the 400-700 nm range of light and 1.4 to 2.4 in the 150-400 nm range of light. The cured film typically has at least 90% retention of optical clarity. In many cases, the composition has a transmittance of at least 95% as measured by the Transmittance Test.

One embodiment is a process for forming a metal-containing film by applying a photosensitive metal-containing composition on a substrate, drying the photosensitive metal-containing composition, exposing the photosensitive metal-containing composition to a source of actinic radiation, and applying a post-treatment to the metal-containing composition. The photosensitive metal-containing composition comprises:
  i. a metal-containing precursor unit (MU) containing at least two reactive functional groups, and
  ii. a photoinitiator or photoactive catalyst
where MU is represented by Structure I $$MA_wB_xC_y$$  Structure I where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y, Ligand A contains a reactive functional group capable of undergoing a combining reaction, w is 2 to 7, Ligands B and C are selected individually or in combination from oxygen, nitrogen, sulfur, or a halogen atom; linear, branched or cyclic alkyl, alkenyl or alkynyl group; substituted or unsubstituted aryl group; and —$XR^1$ where X represents an organic functional group such as oxy, thio, carboxy, thiocarboxy, sulfo, oxalate, acetoacetonate, carbanion, carbonyl, thiocarbonyl, cyano, nitro, nitrito, nitrate, nitrosyl, azide, cyanato, isocyanato, thiocyanato, isothiocyanato, amido, amine, diamine, arsine, diarsine, phosphine, and diphosphine, and $R^1$ represents a linear, branched or cyclic alkyl or thioalkyl group, a heterocyclic group, an alicyclic group, and a substituted or unsubstituted aryl or heteroaryl group; and x and y are 0 to 5.

Optionally, additional steps in the process allow for forming patterned metal-containing films, three-dimensional objects or articles. The process with additional steps comprise applying a photosensitive metal-containing composition on a substrate, drying the photosensitive metal-containing composition, exposing the photosensitive metal-containing composition to a source of actinic radiation through a mask or mold, developing the unexposed portion of the composition and applying a post-treatment to the metal-containing composition.

Another embodiment is a metal-containing film comprising $M_zE_v$ where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine, and z is about 5 to about 95% and z+v is 100%. The metal-containing film is formed by applying a photosensitive metal-containing composition on a substrate wherein the photosensitive metal-containing composition comprises a metal-containing precursor unit (MU) containing at least two reactive functional groups, and a photoinitiator or photoactive catalyst, where MU is represented by Structure I shown above, drying the photosensitive metal-containing composition, exposing the photosensitive metal-containing composition to a source of actinic radiation and applying a post-treatment to the metal-containing composition.

A further embodiment is a directly patterned metal-containing film comprising $M_zE_v$ where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y, E is selected individually or in combination from a group of elements such as oxygen, hydrogen, nitrogen, sulfur, carbon, silicon or fluorine; where z is about 5 to about 95% and z+v is 100%.

Yet another embodiment is a microdevice comprising a substrate and a patterned layer comprising $M_zE_v$, where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and y; E is selected individually or in combination from a group of elements such as oxygen, hydrogen, nitrogen, sulfur, carbon, silicon or fluorine; where z is about 5 to about 95% and z+v is 100% and $M_zE_v$ is formed from an irradiated post-treated photosensitive metal-containing composition wherein the photosensitive metal-containing composition comprises a combination of metal-containing precursor units (MU) containing at least two reactive functional groups and a photoinitiator or photoactive catalyst, where MU is represented by Structure I shown above.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Definitions of Terms Used:
The term "combining reaction" as used herein refers to polymerization and/or crosslinking reactions of ethylenically unsaturated functional groups. The crosslinking is usually chemical crosslinking but in some cases can be physical crosslinking. Combining reactions can take place with MU and MU, MU and PU, and PU and PU (the latter two cases can only occur when PU is present in the composition).

The term "reactive functional group" as used herein refers to functional groups such as epoxide, —SiH, a —SH group and ethylenically unsaturated functional groups such as a vinyl group, an allyl group, a (meth)acryloyl group. Combining reactions include reactions of ethylenically unsaturated functional groups, reactions involving ethylenically unsaturated functional groups with a —SiH group or a —SH group and reactions involving epoxides. The crosslinking is usually chemical crosslinking but in some cases can be physical crosslinking. Combining reactions can take place with MU and MU and with MU and various components.

The term "ligand" as used herein refers to molecules, ions or atoms attached to the central atom of a coordination compound, a chelate or other complex.

The term "compatible" as used herein refers to a homogeneous film which does not show precipitation or phase separation.

The prefix "(meth)acryl" as used herein refers to either an acryl or a methacryl group.

The term "cured" as used herein refers to a composition, film or article that has been crosslinked. A "fully cured" composition, film or article does not show any solubility in acetone as determined by mechanically rubbing a cotton swab soaked in acetone. As used herein, a "partially cured" composition, film or article shows some solubility in acetone as determined by mechanically rubbing a cotton swab soaked in acetone.

As used herein, the term "optically clear" refers to a composition which would have greater than 90% transmittance of light in the 400-700 nm range if it were formed into a film having a thickness of 4-6 μm Many of the compositions disclosed herein have a transmittance of at least 95%. In a number of cases, the transmittance is at least 99%.

In the Transmittance Test, the composition is coated onto a Luminor T PET film from Toray (75 μm thick) with a wire-wound coater (3 mil diameter), Catalog No. AR-4103 from BYK Gardner, to a wet film thickness of 4-6 μm and the transmittance is measured by a UV/Vis spectrophotometer in the 400-700 nm range. Transmittance can be measured before or after curing. Usually, transmittance measurements taken before and after curing are substantially the same.

The term "retention of optical clarity" refers to a cured film or article having at least 90% of its original % transmittance as measured by the Transmittance Test after two months of storage at 23° C. with relative humidity 50-65% under ambient conditions of light.

As used herein, "post-treatment" is a treatment selected individually or in combination from thermal, chemical, or plasma which alters the chemical composition of the resulting metal-containing film.

As used herein, "microdevices" are devices made using microfabrication technologies.

In one embodiment, this invention provides compositions comprising a metal-containing precursor unit (MU), a prepolymer unit (PU), and a catalyst or initiator capable of inducing combining reactions of ethylenically unsaturated groups of MU and PU to form an optically clear film or article Another embodiment is a composition formed by combining compounds comprising a metal-containing precursor unit (MU), a prepolymer unit (PU), and a catalyst or initiator capable of inducing combining reactions of ethylenically unsaturated groups of MU and PU. An important criterion in the selection of the MU and the PU for the metal containing composition of this invention is that they are compatible with each other as determined by the fact that the composition forms an optically clear film or article before curing. The metal-containing compositions are also useful in enhancing refractive index. Films and articles formed by the compositions have excellent optical and thermal properties, chemical resistance, scratch resistance, and surface hardness.

The metal-containing precursor unit (MU) can be selected individually or in combination from precursor units MU1 and MU2. MU2 is a polyhedral oligometallasilasesquioxane (POMSS) and MU1 is represented by Structure I:

$$MA_wB_xC_y$$   Structure I where M comprises a metal with valency of 1-5 such as Zr, Hf, Ge, Ti, Pb, Gd, Sn, Zn, Ni, Na, Li, K, Ce, Nb, Eu, In, Al, Fe, Mn, Nd, Cu, Sb, Mg, Ag, and Y; The A, B, and C groups may be selected to impart compatibility with a variety of prepolymers and organic solvents and to form an optically clear film or article. Here w is 1-5, x is 0-4, and y is 0-4 such that w+x+y equals 1-5

In Structure I, A is represented by Structures IIA, IIB, or IIC

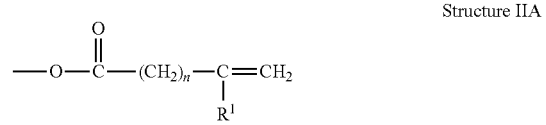

Structure IIA

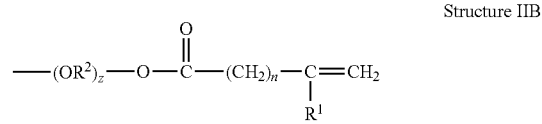

Structure IIB

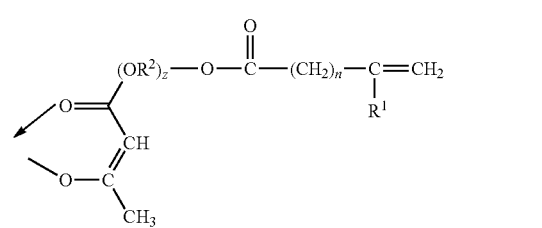

Structure IIC where $R^1$ represents a H atom, an alkyl group containing 1-8 carbon atoms, a group containing a halogen atom, or a hydroxyalkyl group, $R^2$ represents an alkyl group or a substituted or unsubstituted aryl group; z is 1-3; and n is 0-6 (where 0 denotes a direct bond).

B and C are selected individually or in combination from oxygen, sulfur, a halogen atom, or —$OR^3$ where $R^3$ represents an alkyl group, a group containing a halogen atom, or a substituted or unsubstituted aryl group.

Structure I can be further described by Structures V through X.

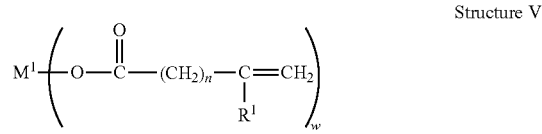

Structure V $M^1$ in Structure V comprises a metal with valency of 1-5, $R^1$ and n are as defined in Structures IIA, IIB, or IIC, and w is as defined in Structure I. Examples of $M^1$ in Structure V are Zr, Hf, Ge, Ti, Pb, Sn, Zn, Ni, Na, Li, Gd, K, Ce, Nb, Eu, In, Al, Fe, Mn, Nd, Cu, Sb, Mg, Ag, and Y. Preferred examples of $M^1$ are Zr, Hf, Ge, Ti, Nb, Gd, Al, In, Sb, Sn, Ag and Y. Examples of $R^1$ are H atom, a methyl, a chloromethyl, a trifluoromethyl, a hydroxymethyl, and a hydroxyethyl. Preferred examples of $R^1$ are H atom and a methyl and n is 0-1.

Preferred examples of Structure V are zirconium, hafnium, titanium, and germanium compounds of (meth)acrylates and vinylacetates. The most preferred example is zirconium (meth)acrylate.

Structure VI

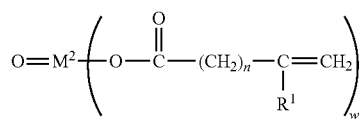

$M^2$ in structure VI is any four-coordinate metal such as Ti, Hf, or Zr; w is 2; and $R^1$ and n are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl and n is 0 or 1. Specific examples of Structure VI are zirconyl, titanium oxide, and hafnium oxide compounds of dimethacrylate and di(vinylacetate). The most preferred example is zirconyl dimethacrylate.

Structure VII

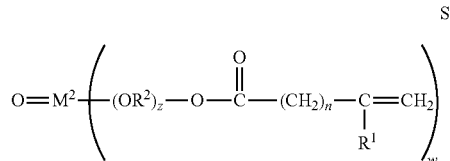

$M^2$ and w in Structure VII are as defined in Structure VI; and n, z, $R^1$, and $R^2$ are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl and n is 0 or 1. Examples of $R^2$ are ethylene, 1-methyl ethylene, propylene, 2,2-dimethoxypropylene, butylene, and phenyl. Preferred examples of $R^2$ are ethylene, 1-methyl ethylene, and 2,2-dimethoxypropylene and z is 1 or 2. Specific examples of Structure VII are zirconyl, titanium oxide, and hafnium oxide compounds of di(2-ethoxy (meth)acrylate), di(2-ethoxyvinylacetate), bis(3-(2,2-dimethoxypropoxy)(meth)acrylate), and bis(3-(2,2-dimethoxypropoxy)vinylacetate).

Structure VIII

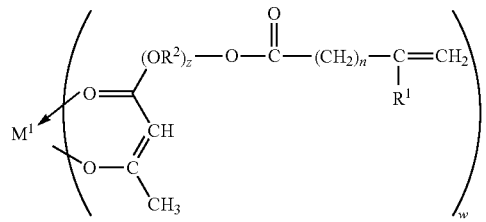

$M^1$ in Structure VIII is as defined in Structure V; w is as defined in Structure I; and n, z, $R^1$, and $R^2$ are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl. Examples of $R^2$ are ethylene, 1-methyl ethylene, 2,2-dimethoxypropylene, propylene, butylene, and phenyl. Preferred examples of $R^2$ are ethylene, 2,2-dimethoxypropylene, and 1-methyl ethylene, n is 0-1, and z is 1 or 2

Specific examples of Structure VIII are zirconium, hafnium, titanium, and germanium compounds of (meth)acryloxyethylacetoacetate, and vinyl acetoxyethylacetoacetate.

Structure IX

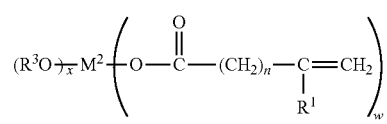

$M^2$ in Structure IX is as defined in Structure VI; $R^1$ and n are as defined in Structures IIA, IIB, or IIC, w is 1-3 and x is 1-3 such that w+x equals 4. $R^3$ represents an alkyl group, a group containing a halogen atom, or a substituted or unsubstituted aryl group. Examples of $R^1$ are H atom, methyl, chloromethyl, trifluoromethyl, hydroxymethyl, and hydroxyethyl. Preferred examples of $R^1$ are H atom and methyl and n is 0-1 Examples of $R^3$ are methyl, ethyl, propyl, 1-methylethyl, butyl, 2-methylpropyl, 1,1-dimethylethyl, phenyl, and cyclohexyl Preferred examples of $R^3$ are ethyl, propyl, 1-methylethyl, butyl, 2-methylpropyl, and 1,1-dimethylethyl.

Specific examples of Structure IX are zirconium, hafnium, titanium, and germanium compounds of mono-, di- or tri-(meth)acrylate or vinylacetate and mono-, di- or tri-alkoxides. The preferred examples of Structure IX are zirconium diacrylate dibutoxide and titanium methacrylate triisopropoxide.

Structure X

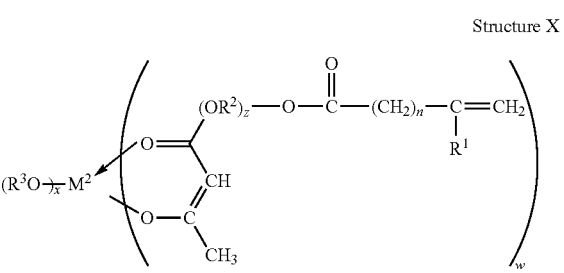

$M^2$ in Structure X is as defined in Structure VI; n, z, $R^1$, and $R^2$ are as defined in Structures IIA, IIB, or 110; $R^3$ is as defined in Structure IX; w is 1-3 and x is 1-3 such that w+x equals 4. Examples of $R^1$ are H atom, methyl, chloromethyl, trifluoromethyl, hydroxymethyl, and hydroxyethyl. Preferred examples of $R^1$ are H atom and methyl and n is 0 or 1 z is 1 or 2. Examples of $R^2$ are ethylene, 1-methyl ethylene, 2,2-dimethoxypropylene, propylene, butylene, and phenyl. Preferred examples of $R^2$ are ethylene, 2,2-dimethoxypropylene, and 1-methyl ethylene and y is 1 or 2. Examples of $R^3$ are methyl, ethyl, propyl, 1-methylethyl, butyl, 2-methylpropyl, 1,1-dimethylethyl, phenyl, and cyclohexyl. Preferred examples of $R^3$ are ethyl, propyl, 1-methylethyl, butyl, 2-methylpropyl, and 1,1-dimethylethyl.

Examples of Structure X are zirconium, hafnium, titanium, and germanium alkoxide compounds of mono-, di- or tri-(meth)acryloxy- or vinylacetoxy-acetoacetate. A preferred example of Structure X is titanium methacryloxyethylacetoacetate triisopropoxide.

The photosensitive metal-containing composition in the above embodiments comprises a metal-containing precursor unit (MU) and a photoactive catalyst or a photoinitiator. The photoactive catalyst or photoinitiator absorbs significant portion of the actinic light and is capable of inducing combining reactions in MU so that the composition becomes insoluble to solvent or developer employed in the subsequent step of developing away the unexposed portion of the composition. The MU contains at least two reactive functional groups capable of undergoing combining reactions induced by the photoactive catalyst or photoinitiator when exposed to actinic source of light. MU is represented by Structure I $$MA_wB_xC_y$$  Structure I where M comprises a metal with formal valency of 0-7 such as Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y;

Ligand A contains a reactive functional group capable of undergoing a combining reaction in the presence of a suitable photoinitiator or photoactive catalyst typically employed in formulating these compositions; w is 2 to 7. Ligand A contains an ethylenically unsaturated functional group such as a (meth)acryloyl, vinyl, allyl, styryl, or cyclic olefinic group or other reactive functional groups such as an epoxide group, a SiH group, and a SH group, which are capable of undergoing a combining reaction with other reactive functional groups of various components. This reaction generally occurs in the presence of a suitable photoinitiator or photoactive catalyst and a source of actinic radiation.

Ligands B and C are selected individually or in combination from oxygen, nitrogen, sulfur, or a halogen atom; linear, branched or cyclic alkyl, alkenyl or alkynyl group; substituted or unsubstituted aryl group; or —$XR^1$ where X represents an organic functional group such as oxy, thio, carboxy, thiocarboxy, sulfo, oxalate, acetoacetonate, carbanion, carbonyl, thiocarbonyl, cyano, nitro, nitrito, nitrate, nitrosyl, azide, cyanato, isocyanato, thiocyanato, isothiocyanato, amido, amine, diamine, arsine, diarsine, phosphine, and diphosphine, and $R^1$ represents a linear, branched or cyclic alkyl or thioalkyl group, a heterocyclic group, an alicyclic group, or a substituted or unsubstituted aryl or heteroaryl group; x and y are 0 to 5. An example of an alkenyl group is ethylene. An example of an alkynyl group is acetylene. Some examples of a carbanion are 2,2-dimethyl-4,6-dioxo-1,3-dioxan-5-ide, dicyanomethanide, cyclopenta-2,4-dienide, and phenylethynide.

In examples where a dielectric constant (k) greater than 2 is required, the metal-containing precursor (MU) contains high k metals such as zirconium and hafnium.

Ligands A, B and C are chosen to control absorbance and refractive index, control morphology, and no portion of the ligand may interfere in the reactivity of the reactive functional group of Ligand A. Ligands A, B and C are selected to impart solubility in a variety of organic solvents commonly used in coating formulations and to impart compatibility with other ingredients used in the preparation of the photosensitive metal-containing composition. The groups may also be chosen to facilitate decomposition during the thermal/plasma treatment stage of the process.

Ligands A, B and C can also play role in controlling important functional properties such as adhesion to a variety of substrates, viscosity, mechanical and thermal properties of the film formed from the photosensitive metal-containing composition. For instance, it is important to choose functional groups that do not absorb significant portion of radiation to ensure uniform photoreaction throughout the composition. Similarly, thermal decomposition temperature of the material can be modified by choosing appropriate functional groups. Also the mechanical properties of the film can be tailored via appropriate selection of the functional groups.

Specific examples of Ligand A are (meth)acrylate, 2-carboxyethyl acrylate, vinyl acetate, 3-butenoate, 4-pentenoate, vinyl sulfonate, styrene sulfonate, vinylphenolate, vinyl benzoate, bicyclo[2.2.1]hept-5-ene-2-carboxylate, 2-ethoxy (meth)acrylate, 2-ethoxyvinylacetate, 3-(2,2-dimethoxypropoxy) (meth)acrylate, (meth)acryloxyethylacetoacetate, 2-(acryloxy)-5-oxo-4-oxatricyclo[$4.2.1.0^{3,7}$]nonane-9-carboxylate, 5-(bicyclo[2.2.1]hept-5-en-2-ylthio)bicyclo[2.2.1]heptane-2-carboxylate, oxiran-2-ylmethanolate, oxirane-2-carboxylate, 3-oxatricyclo[$3.2.1.0^{2,4}$]octane-6-carboxylate, 3,8-dioxatricyclo[$5.1.0.0^{2,4}$]octane-5-carboxylate, 7-oxabicyclo[4.1.0]heptane-1-carboxylate, 7-oxabicyclo[4.1.0]heptane-3-carboxylate and (3-phenyloxiran-2-yl)methanolate.

Some non-limiting examples of Ligands B and C are oxygen atom, a sulfur atom, a nitrogen atom, a chlorine atom, methyl, ethyl, ethylene, cyclopentadiene, norbornene, acetylene, methoxy, ethoxy, propoxy, butoxy, isopropoxy, 2-methoxyethoxy, 2-ethylhexoxy, cyclohexanolate, bicyclo[2.2.1]heptan-2-olate, phenoxy, naphthoxy, methanethiolate, ethanethiolate, propanethiolate, butanethiolate, isopropanethiolate, 2-ethylhexanethiolate, cyclohexanethiolate, bicycle[2.2.1]heptanethiolate, benzenethiolate, naphthalenethiolate, acetate, propanoate, butanoate, 2-methyl propanoate, 2-ethylhexanoate, 2-bromo-5-oxo-4-oxatricyclo[$4.2.1.0^{3,7}$]nonane-9-carboxylate, 6-(2-naphthylthio)bicyclo[2.2.1]heptane-2-carboxylate, ethanethioate, propanethioate, butanethioate, 2-methyl propanethioate, 2-ethylhexanethioate, methanesulfonate, ethanesulfonate, propanesulfonate, butanesulfonate, cyclohexanesulfonate, [(1S,4R)-7,7-dimethyl-2-oxobicyclo[2.2.1]hept-1-yl]methanesulfonate, 4-methyl benzenesulfonate, oxalate, acetoacetonate, 1,3-diphenylpropane-1,3-dione, 2,2,6,6-tetramethylheptane-3,5-dione, 2,2-dimethyl-4,6-dioxo-1,3-dioxan-5-ide, dicyanomethanide, cyclopenta-2,4-dienide, phenylethynide, nitromethane, nitroethylene, methyl nitrate, phenyl azide, methyl isocyanate, allyl isothiocyanate, triethylamine, ethylene diamine, triphenyl arsine, triphenyl phosphine, t-butyl phosphine and trimethyl phosphine.

Specific non-limiting examples of metal-containing precursor unit (MU) are zirconium (meth)acrylate, zirconyl di(meth)acrylate, zirconium butoxide (meth)acrylate, zirconium carboxyethyl acrylate, zirconium vinyl acetate, zirconyl di(vinyl acetate), zirconium 3-oxatricyclo[$3.2.1.0^{2,4}$]octane-6-carboxylate, zirconium 2-bromo-5-oxo-4-oxatricyclo[$4.2.1.0^{3,7}$]nonane-9-carboxylate (meth)acrylate, zirconium 6-(2-naphthylthio)bicyclo[2.2.1]heptane-2-carboxylate (meth)acrylate, zirconium [(1S,4R)-7,7-dimethyl-2-oxobicyclo[2.2.1]hept-1-yl]methanesulfonate 2-naphthalenethiolate (meth)acrylate, hafnium (meth)acrylate, hafnium butoxide (meth)acrylate, hafnium oxide di(meth)acrylate, hafnium carboxyethyl acrylate, hafnium vinyl acetate, and hafnium so oxide di(vinyl acetate), hafnium 3-oxatricyclo[$3.2.1.0^{2,4}$]octane-6-carboxylate, hafnium 2-bromo-5-oxo-4-oxatricyclo[$4.2.1.0^{3,7}$]nonane-9-carboxylate (meth)acrylate, hafnium 6-(2-naphthylthio)bicyclo[2.2.1]heptane-2-carboxylate (meth)acrylate, hafnium [(1S,4R)-7,7-dimethyl-2-oxobicyclo[2.2.1]hept-1-yl]methanesulfonate 2-naphthalenethiolate (meth)acrylate, titanium (meth)acrylate, titanium butoxide (meth)acrylate, titanium oxide di(meth)acrylate, titanium carboxyethyl acrylate, titanium vinyl acetate, titanium oxide di(vinyl acetate), titanium 3-oxatricyclo[$3.2.1.0^{2,4}$]octane-6-carboxylate, titanium 2-bromo-5-oxo-4-oxatricyclo[$4.2.1.0^{3,7}$]nonane-9-carboxylate (meth)acrylate, titanium 6-(2-naphthylthio)bicyclo[2.2.1]heptane-2-carboxylate (meth)acrylate, titanium [(1S,4R)-7,7-dimethyl-2-oxobicyclo[22.1]hept-1-yl]methanesulfonate 2-naphthalenethiolate (meth)acrylate, di-n-butoxydi(meth)acryloxygermane, tetracarboxyethylacryloxygermane, tetravinylacetoxygermane, tetra(meth)acryloxygermane, 3-oxatricyclo[3.2.1.0$^{2,4}$]octane-6-carboxygemane, 2-bromo-5-oxo-4-oxatricyclo[4.2.1.0$^{3,7}$]nonane-9-carboxytri(meth)acryloxygermane, 6-(2-naphthylthio)bicyclo[2.2.1]heptane-2-carboxytri(meth)acryloxygermane, tantalum (meth)acrylate, tantalum butoxide (meth)acrylate, tantalum carboxyethyl acrylate, tantalum vinyl acetate, tantalum 3-oxatricyclo[3.2.1.0$^{2,4}$]octane-6-carboxylate, tantalum 2-bromo-5-oxo-4-oxatricyclo[4.2.1.0$^{3,7}$]nonane-9-carboxylate (meth)acrylate, tantalum 6-(2-naphthylthio)bicyclo[2.2.1]heptane-2-carboxylate (meth)acrylate, aluminum (meth)acrylate, aluminum butoxide (meth)acrylate, aluminum carboxyethyl acrylate, aluminum vinyl acetate, aluminum 3-oxatricyclo[3.2.1.0$^{2,4}$]octane-6-carboxylate, aluminum 2-bromo-5-oxo-4-oxatricyclo[4.2.1.0$^{3,7}$]nonane-9-carboxylate (meth)acrylate, aluminum 6-(2-naphthylthio)bicyclo[2.2.1]heptane-2-carboxylate (meth)acrylate, niobium (meth)acrylate, niobium butoxide (meth)acrylate, niobium carboxyethyl acrylate, niobium vinyl acetate, niobium 3-oxatricyclo[3.2.1.0$^{2,4}$]octane-6-carboxylate, niobium 2-bromo-5-oxo-4-oxatricyclo[4.2.1.0$^{3,7}$]nonane-9-carboxylate (meth)acrylate and niobium 6-(2-naphthylthio)bicyclo[2.2.1]heptane-2-carboxylate (meth)acrylate.

The polyhedral oligometallasilasesquioxane (POMSS) of MU2 are cage-compounds comprising Si, O and metal atoms. Typically, POMSS compounds comprise both metal oxides and silicon oxides represented by Structure III and Structure IV, respectively:

Structure III

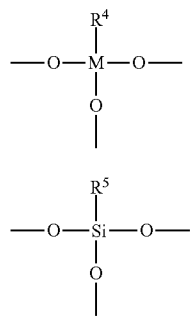

Structure IV

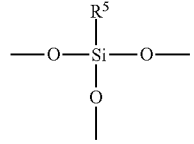

where M is a four-coordinate metal, $R^4$ and $R^5$ independently represent an alkyl group, an alkyl ether group, a group containing a halogen atom, a substituted or unsubstituted silyl group, a substituted or unsubstituted aryl group, a substituted or unsubstituted aryl ether group, a hydroxyl group, a thiol group, a carboxylic group, an amino group, or an ethylenically unsaturated functional group such as a (meth)acryloyl group, a substituted or unsubstituted styryl group, a vinyl group, or an allyl group. $R^4$ and $R^5$ groups are selected to contain at least two ethylenically unsaturated functional groups if used individually or at least one ethylenically unsaturated functional group if used in combination with MU1 POMSS can be closed or open cages. The term "closed" means a siloxane/metal cage compound where each metal atom of a cage is linked to no more than three Si atoms of the same cage through oxygen atoms and each Si atom of the cage is linked to no more than three metal atoms of the same cage through oxygen atoms. The term "open" means a siloxane/ metal cage compound similar to a closed polyhedral oligometallasilasesquioxane" except where two or three Si or metal atoms of the cage are each linked to no more than two other metal or Si atoms, respectively, of the same cage through oxygen atoms.

The polyhedral oligometallasilasesquioxane can be further described by structures XI through XIII Structure XI

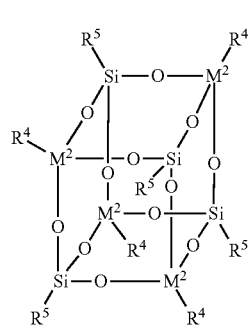

Structure XII

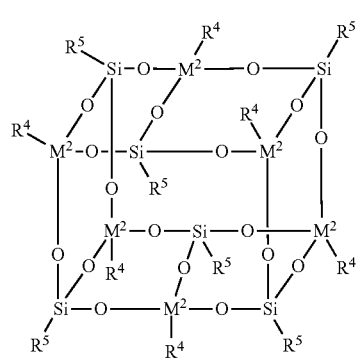

Structure XIII

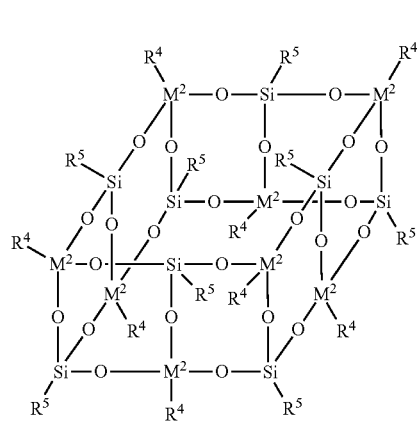

$M^2$ in Structures XI, XII, and XIII is a four-coordinate metal such as Ti, Zr, Hf, or Ge; $R^4$ and $R^5$ are defined as in Structures III and IV. Examples of $R^4$ and $R^5$ are methyl, ethyl, propyl, 1-methylethyl, butyl, 2-methylpropyl, 1,1-dimethylethyl, phenyl, styryl, cyclohexyl, methoxy, ethoxy, propoxy, 1-methylethoxy, butoxy, 2-methylpropoxy, 1,1-dimethylethoxy, substituted and unsubstituted phenoxy, (meth)acryloxy, substituted and unsubstituted aniline, allyl, vinyl, and hydroxyl. Preferred examples of $R^4$ and $R^5$ are acryloxy, methacryloxy, ethoxy, 1-methylethoxy, substituted and unsubstituted phenoxy, substituted and unsubstituted aniline, and hydroxyl.

Examples of Structure XI, XII, and XIII are titanasilasesquioxanes, zirconasilasesquioxanes, hafnasilasesquioxanes, or germanasilasesquioxanes Preparation of such molecules is described by R Murugavel, V Chandrasekhar, and Roesky, *Acc. Chem. Res.,* 1996, 29, 183-189 and is incorporated herein as reference. A preferred example of MU2 of this invention is described by Structure XIV, which is prepared by reacting polymerizable metal carboxylate precursors such as titanium acrylate with a structurally hindered trihydroxy silane such as, 2,4,6-tri-tertiary-butylphenoxy trihydroxysilane as shown in Scheme I.

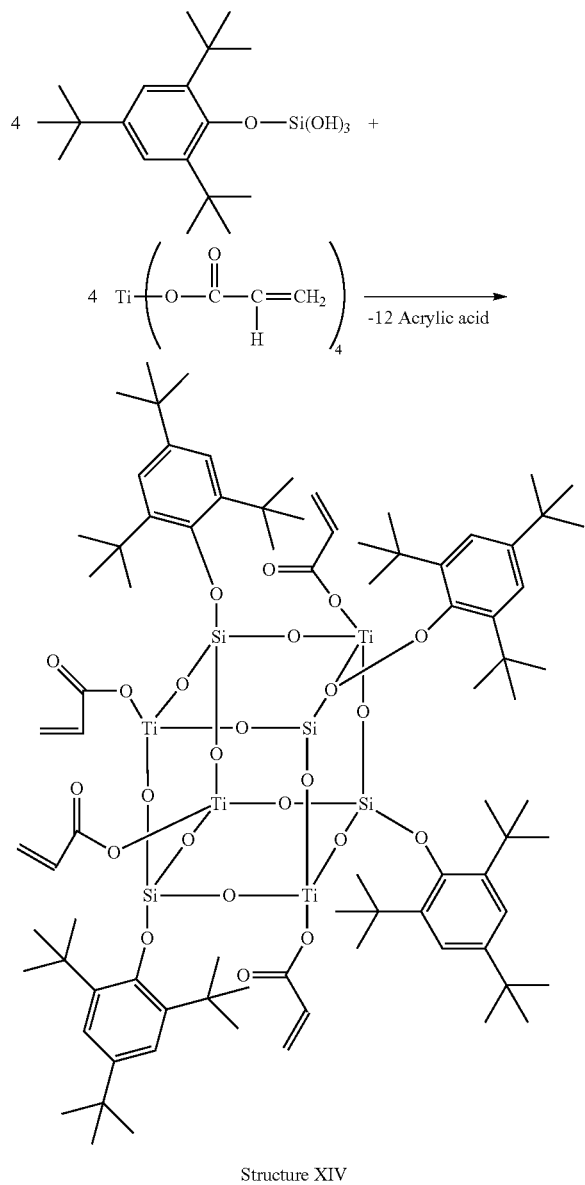

Structure XIV

A similar reaction scheme is followed to prepare zirconium, hafnium and germanium derivatives of Structure XIV. The unique advantage of this cage structure over the compounds described by R. Murugavel et al, is that they contain acryloxy groups capable of further combining reactions with a PU. Role of 2,4,6-tri-tertiary-butylphenoxyl groups is to impart compatibility with organic solvents as well as PU groups. The metal atoms are separated from each other by siloxane bonds, preventing agglomeration of metal groups as in the case of metal oxides; hence, compositions comprising cage compounds as in Structure XIV form an optically clear film or article.

The term prepolymer unit (PU) refers to a monomer unit or an oligomer where oligomer refers to combination of monomer units joined together. The prepolymer may contain many monomer units and is capable of further reactions to be incorporated in is the final material. Examples of such monomer units/oligomers are based on one or more of the following types: acrylate, ester, vinyl alcohol, urethane, urea, carbonate, pyranose, siloxane, urea-formaldehyde and melamine-formaldehyde. The PU contains at least two terminal and/or pendant ethylenically unsaturated groups. These can participate in combining reactions with metal-containing precursor units (MU). Examples of such terminal and pendant groups are a vinyl group, an allyl group, and a (meth)acryloyl group. The monomer units of the PU may be selected to be compatible with MU so that the composition forms an optically clear film or article before curing.

In embodiments, examples of such monomer units/oligomers are based on one or more of the following types: imide, amide, and carboxazole. The PU contains at least two terminal and/or pendant reactive functional groups. In embodiments, examples of such terminal and pendant groups are an epoxy group, a SiH group, and a —SH group.

Specific examples of prepolymer unit (PU) include urethane acrylate oligomer. The term urethane acrylate oligomer refers to a class of compounds that contain urethane linkages and have (meth)acrylate functional groups such as urethane multi(meth)acrylate, multiurethane (meth)acrylate, and multiurethane multi(meth)acrylate. Types of urethane (meth)acrylate oligomers have been described by Coady et al. in U.S. Pat. No. 4,608,409 and by Chisholm et al. in U.S. Pat. No. 6,844,950 and are incorporated herein as references. Other specific examples of prepolymer unit (PU) include 1,6-hexanediol di(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)-isocyanurate di(meth)acrylate, 1,3-butanediol dimeth)acrylate, 1,4-butanediol di(meth)acrylate, neopentyl glycol di(meth)acrylate, and (meth)acrylate modified-urea-formaldehyde, melamine-formaldehyde and cellulose.

In embodiments, other specific examples of prepolymer unit (PU) include siloxanes having vinyl, allyl, (meth) acryloyol, or hydro-silane terminal or pendent functional groups. In embodiments, specific examples of such siloxane prepolymer units include vinyl-, epoxide- or (meth)acryl-terminated polyhedyrl oligomeric silsesquioxanes (POSS) (Hybrid Plastics codes OL1160, EP0409, MA0735 and MA0736), vinyl-terminated polydimethylsiloxanes (CAS 68083-19-2), vinyl terminated diphenylsiloxane-dimethylsiloxane copolymer (CAS 68951-96-2), vinyl terminated polyphenylmethylsiloxane (CAS 225927-21-9), vinyl terminated diethylsiloxane-dimethylsiloxane copolymer (Gelest Code EDV-2025), vinylmethylsiloxane-dimethylsiloxane copolymers, trimethylsiloxy terminated (CAS 67762-94-1), vinylmethylsiloxane-dimethylsiloxane copolymers, vinyl terminated (CAS 68083-18-1), vinylmethylsiloxane-homopolymers (Gelest. Code VMS-oo5 and VMS-T11). Vinyl T-structured polymers (Gelest Code VTT-106 and MTV-124), vinylmethylsiloxane terpolymers (CAS 597543-32-3), vinylmethoxysiloxane homopolymer (CAS131298-48-1), vinylethoxysiloxane homopolymer (CAS 29434-25-1), vinyl-propylethoxysiloxane copolymer (Gelest Code VPE-005), hydride terminated poly-dimethyl siloxanes (CAS 70900-21-9), methylhydrosiloxane-dimethylsiloxane copolymers, trimethylsiloxy terminated (CAS 68037-59-2), methylhydrosiloxane-dimethylsiloxane copolymers, hydride terminated (CAS 69013-23-6), polymethylhydrosiloxanes, trimethylsiloxy terminated (CAS 63148-57-2), polyethylhydrosiloxane, triethylsiloxy terminated (CAS 24979-95-1), polyphenyl-(dimethylhydroxysiloxy)siloxane, hydride terminated (Gelest Code HDP-111) and hydride Q resin (CAS 68988-57-8).

A non-limiting example of a preferred prepolymer unit is urethane acrylate oligomer, commercially available from Sartomer Company.

The prepolymer often has an average molecular weight between 70 and $10^7$ Daltons. A more preferred upper limit of molecular weight is $10^6$ Daltons. The most preferred upper limit of molecular weight is $10^5$ Daltons.

Preferably the composition comprises between about 5-90 weight % (on the basis of total solids) of metal-containing precursor unit (MU).

In another embodiment, this invention provides compositions comprising metal-containing precursor unit (MU) and a catalyst or an initiator capable of inducing combining reactions of ethylenically unsaturated groups of two or more MUs to form an optically clear film or article. Typically, the composition is optically clear even before it is formed into a film or article (before curing) and remains optically clear when it is cured. MU1 and MU2 can be used individually or in combination with the proviso that at least a portion of MU contains at least two ethylenically unsaturated functional groups.

The composition may further comprise mono-functional ethylenically unsaturated monomers (M). For instance, an acrylate monomer may be used to improve the physical properties of the final film or article. The acrylate monomer is incorporated into the film or article by combining reactions with MU and or PU.

The photosensitive metal-containing composition may further comprise organic monomer containing one reactive functional group or a polymer. For instance, acrylate monomer or vinyl ether may be used to improve the physical properties of the final film such as viscosity. The acrylate monomer or vinyl ether is incorporated into the film or article by combining reactions with MU and/or other various components.

The novel invention further comprises a catalyst or an initiator capable of inducing a combining reaction in the presence of light or heat. Examples of photoinitiators include but are not limited to 2-hydroxy-2-methyl-1-phenylpropan-1-one, 1-hydroxycyclohexyl phenyl ketone (Irgacure 184 from Ciba Specialty Chemical), a blend of 1-hydroxycyclohexylphenylketone and benzophenone (Irgacure 500 from Ciba Specialty Chemical), 2,4,4-trimethylpentyl phosphine oxide (Irgacure 1800, 1850, and 1700 from Ciba Specialty Chemical), 2,2-dimethoxyl-2-acetophenone (Irgacure 651 from Ciba Specialty Chemical), bis(2,4,6-trimethyl benzoyl) phenyhl-phosphine oxide (Irgacure 819 from Ciba Specialty Chemical), 2-methyl-[4-(methylthio)phenyl]-2-morphorino-propane-1-on (Irgacure 907), (2,4,6-trimethylbenzoyl)diphenyl phosphine oxide (Lucerin TPO from BASF), ethoxy(2,4,6-trimethylbenzoyl)phenyl phosphine oxide (Lucerin TPO-L from BASF), a blend of phosphine oxide, α-hydroxy ketone and a benzophenone derivative (ESACURE KT046 from Sartomer), 2-hydroxy-2-methyl-1-phenylpropane-1-on (Darocur 1173 from Merck), benzophenone, 2-chlorothioxanthone, 2-methylthioxanthone, 2-isopropylthioxanthone, benzodimethyl ketal, 1,1,1-trichloroacetophenone, diethoxyacetophenone, m-chloroacetophenone, propiophenone, anthraquinone, and dibenzosuberone.

The photoactive catalyst or photoinitiator used in the composition is a compound that absorbs light at the wavelength of exposure and is capable of catalyzing combining reactions of the MU and/or other various components, when composition or a portion of composition is exposed to light. An example of a free-radical photoinitiator is 1-hydroxy-cyclohexyl-phenyl-ketone, (Irgacure 184) from Ciba Specialty Chemicals. An example of a photoactive catalyst is a photoacid generator such as triphenyl sulfonium triflate from Aldrich Catalog No. 526940.

Specific examples of nonionic-type photoactive catalysts are phenacyl p-methylbenzenesulfonate, benzoin p-toluenesulfonate, a-(p-toluene-sulfonyloxy)methylbenzoin, 3-(p-toluenesulfonyloxy)-2-hydroxy-2-phenyl-1-phenylpropyl ether, N-(p-dodecylbenzenesulfonyloxy)-1,8-naphthalimide and N-(phenyl-sulfonyloxy)-1,8-napthalimide, (2Z)-(2-methylphenyl)[(2Z)-2-{[(propylsulfonyl)oxy]imino}thiophen-3(2H)-ylidene]acetonitrile, (2Z)-[(2Z)-2-{[(octylsulfonyl)oxy]imino}thiophen-3(2H)-ylidene](2-methylphenyl) acetonitrile, (2Z)-[(2Z)-2-{[((7,7-dimethyl-2-oxobicyclo [2.2.1]hept-1-yl)methanesulfonyl)oxy]imino}thiophen-3 (2H)-ylidene](2-methylphenyl)acetonitrile, (2Z)-[(2Z)-2-{[(4-methylbenzenesulfonyl)oxy]imino}thiophen-3(2H)-ylidene](2-methylphenyl)acetonitrile, (2Z)-(4-methoxyphenyl){[(octylsulfonyl)oxy]imino}acetonitrile, 2-[2,2,3,3,4,4,5,5-octafluoro-1-(nonafluorobutylsulfonyloxyimino)-pentyl]fluorine, bis(p-toluenesulfonyl)diazomethane, methylsulfonyl p-toluenesulfonyldiazomethane, 1-cyclohexylsulfonyl-1-(1,1-dimethylethylsulfonyl)diazomethane, bis(1,1-dimethylethylsulfonyl)diazomethane, bis(1-methylethylsulfonyl)diazomethane, bis(cyclohexylsulfonyl)diazomethane, 1-p-toluenesulfonyl-1-cyclohexylcarbonyldiazomethane, 2-methyl-2-(p-toluenesulfonyl)propiophenone, 2-methanesulfonyl-2-methyl-(4-methylthiopropiophenone, 2,4-methyl-2-(p-toluenesulfonyl)pent-3-one, 1-diazo-1-methylsulfonyl-4-phenyl-2-butanone, 2-(cyclohexylcarbonyl-2-(p-toluenesulfonyl)propane, 1-cyclohexylsulfonyl-1-cyclohexylcarbonyldiazomethane, 1-diazo-1-cyclohexylsulfonyl-3,3-dimethyl-2-butanone, 1-diazo-1-(1, 1-dimethylethylsulfonyl)-3,3-dimethyl-2-butanone, 1-acetyl-1-(1-methylethylsulfonyl)diazomethane, 1-diazo-1-(p-toluenesulfonyl)-3,3-dimethyl-2-butanone, 1-diazo-1-benzenesulfonyl-3,3-dimethyl-2-butanone, 1-diazo-1-(p-toluenesulfonyl)-3-methyl-2-butanone, cyclohexyl 2-diazo-2-(p-toluenesulfonyl)acetate, tert-butyl 2-diazo-2-benzenesulfonylacetate, isopropyl-2-diazo-2-methanesulfonylacetate, cyclohexyl 2-diazo-2-benzenesulfonylacetate, tert-butyl 2 diazo-2-(p-toluenesulfonyl)acetate, 2-nitrobenzyl p-toluenesulfonate, 2,6-dinitrobenzyl p-toluenesulfonate, and 2,4-dinitrobenzyl p-trifluoromethylbenzenesulfonate.

Specific examples of ionic-type photoactive catalysts are triphenyl sulfonium methanesulfonate, triphenyl sulfonium trifluoromethanesulfonate, triphenyl sulfonium hexafluoropropanesulfonate, triphenyl sulfonium nonafluorobutanesulfonate, triphenyl sulfonium perfluorooctanesulfonate, triphenyl sulfonium phenyl sulfonate, triphenyl sulfonium 4-methyl phenyl sulfonate, triphenyl sulfonium 4-methoxyphenyl sulfonate, triphenyl sulfonium 4-chlorophenyl sulfonate, triphenyl sulfonium camphorsulfonate, 4-methylphenyl-diphenyl sulfonium trifluoromethanesulfonate, bis(4-methylphenyl)-phenyl sulfonium trifluoromethanesulfonate, tris-4-methyl phenyl sulfonium trifluoromethanesulfonate, 4-tert-butyl phenyl-di phenyl sulfonium trifluoromethanesulfonate, 4-methoxyphenyl-diphenyl sulfonium trifluoromethanesulfonate, mesityl-diphenyl sulfonium trifluoromethanesulfonate, 4-chlorophenyl-diphenyl sulfonium trifluoromethanesulfonate, bis(4-chlorophenyl)-phenyl sulfonium trifluoromethanesulfonate, tris(4-chlorophenyl) sulfonium trifluoromethanesulfonate, 4-methylphenyl-diphenyl sulfonium hexafluoropropanesulfonate, bis(4-methylphenyl)-phenyl sulfonium hexafluoropropanesulfonate, tris-4-methylphenyl sulfonium hexafluoropropanesulfonate, 4-Cert-butylphenyl-diphenyl sulfonium hexafluoropropane sulfonate, 4-methoxyphenyl-diphenyl sulfonium hexafluoropropane sulfonate, mesityl-diphenyl sulfonium hexafluoropropane sulfonate, 4-chlorophenyl-diphenyl sulfonium hexafluoropropane sulfonate, bis(4-chlorophenyl)-phenyl sulfonium hexafluoropropane sulfonate, tris(4-chlorophenyl) sulfonium hexafluoropropane sulfonate, 4-methylphenyl-diphenyl sulfonium perfluorooctanesulfonate, bis(4-methylphenyl)-phenyl sulfonium perfluorooctanesulfonate, tris-4-methylphenyl sulfonium perfluoroocatanesulfonate, 4-tert-butylphenyl-diphenyl sulfonium perfluorooctane sulfonate, 4-methoxyphenyl-diphenyl sulfonium perfluorooctane sulfonate, mesityl-diphenyl sulfonium perfluorooctane sulfonate, 4-chlorophenyl-diphenyl sulfonium perfluorooctane sulfonate, bis(4-chlorophenyl)-phenyl sulfonium perfluorooctane sulfonate, tris(4-chlorophenyl) sulfonium perfluorooctane sulfonate, diphenyl iodonium hexafluoropropane sulfonate, diphenyl iodoniurn 4-methylphenyl sulfonate, bis(4-tert-butyl phenyl)iodonium trifluoromethane sulfonate, bis(4-tert-butyl phenyl)iodonium hexafluoromethane sulfonate, and bis(4-cyclohexylphenyl)iodonium trifluoromethane sulfonate.

Examples of catalysts or initiators useful in inducing a combining reaction the presence of heat include but are not limited to organic peroxides such as benzoyl peroxide, diacylperoxides, peroxydicarbonates, alkylperesters, alkyl peroxides, perketals, ketoneperoxides, and alkylhydroperoxides as well as azo compounds such as azobisisobutyronitrile and 1,1'-azobis(cyclohexanecarbonitrile).

In embodiments, specific examples of catalysts or initiators useful in inducing a combining reaction the presence of heat include but are not limited to thermal acid generators such as cyclohexyltosylate and K-Cure 1040 from King Industries.

The catalyst or initiator is typically employed in the amounts of about 0.0001 to 20% by weight and more preferably about 1% to 10%. The amount of catalyst or initiator is based on the combined weights of MU, PU, and M.

The composition may further comprise a suitable solvent. The choice of solvent for the formulation and the concentration thereof depends principally on the type of functionalities incorporated in the metal-containing precursor unit (MU) and prepolymer unit (PU) along with the catalyst or initiator and the coating method. The solvent should be inert, should dissolve or uniformly disperse all the components in the composition, should not undergo any chemical reaction with the components, and should be removable on drying after coating. The solvent is generally present in the composition in an amount of from about 1 to about 90% by weight, and typically is present in the composition in an amount of 20-60 weight % Suitable solvents for the composition may include non-aqueous solvents such as ketones, ethers, esters and alcohols. Examples of ketones, ethers, and esters include 2-butanone, 3-methyl-2-butanone, 2-heptanone, cyclopentanone, cyclohexanone, 2-methoxy-1-propylene acetate, 2-methoxyethanol, 2-ethoxyethanol, 2-ethoxyethyl acetate, 1-methoxy-2-propyl acetate, 1,2-dimethoxy ethane ethyl acetate, cellosolve acetate, methyl lactate, ethyl lactate, n-butyl acetate, methyl pyruvate, ethyl pyruvate, methyl 3-methoxypropionate, ethyl 3-methoxypropionate, N-methyl-2-pyrrolidone, 1,4-dioxane, ethylene glycol monoisopropyl ether, diethylene glycol monoethyl ether, diethylene glycol monomethyl ether, diethylene glycol dimethyl ether, and the like. Examples of alcohol solvents include methanol, ethanol, 1-propanol, 2-propanol, butanol, and the like.

The photosensitive metal-containing composition may further comprise treated or untreated metal-containing nanoparticles. The metal entity of the nanoparticles and the metal-containing precursor unit (MU) may be different and the ratio of metal atoms to organic atoms is from about 5:1 to about 10:1. The nanoparticles suitable for this application are preferably less than 20 µm in diameter and are compatible with the other components of the photosensitive composition. Examples of such nanoparticles are found in U.S. Pat. Nos. 6,291,070 and 6,844,950.

A few nonlimiting examples of metal-containing nanoparticles are surface treated or untreated silica, alumina, titania, zirconia, hafnia, CdSe, CdS, CdTe, CuO, zinc oxide, lanthanum oxide, niobium oxide, tungsten oxide, strontium oxide, calcium titanium oxide, sodium titanate, and potassium niobate.

The composition may further comprise conventional additives, such as dyes, adhesion promoters, buffers, sensitizers, stabilizers, anti-oxidants, colorants, and surfactants. Similarly, a dye may be used to improve the sensitivity of the coating to actinic rays required for the purpose of curing the film.

In embodiments, the composition may further comprise conventional additives, such as surface active agents, viscosity modifiers, and pigments.

Examples of antioxidants include but are not limited to hindered phenols (Irganox 1010 from Ciba Specialty Chemical), sulfides, organoboron compounds, and N,N'-hexamethylenebis(3,5-di-tert-butyl-4-hydroxyhydrocinnamamide) (Irganox 1098 from Ciba Specialty Chemical).

Examples of photostabilizers include but are not limited to poly[(6-morpholino-s-triazine-2,4-diyl)][(2,2,6,6-tetramethyl-4-piperidyl)imino]-hexamethylene[2,2,6,6-tetramethyl-4-piperidyl]imino (Cyasorb UV-3346 from Cytec).

Examples of free radical scavengers include but are not limited to oxygen, hindered amine light stabilizers, hindered phenols, 2,2,6,6-tetramethyl-1-piperidinyloxy free radical (TEMPO), and nitrones.

A person skilled in the art will be able to choose the appropriate desired additive and its concentration.

Another embodiment is a process for preparing a formulation for the composition by mixing the metal containing precursor unit (MU), the prepolymer unit (PU), and the suitable catalyst/initiator compound along with a suitable solvent and any conventional additive.

The process described in the above embodiments comprises formulating by mixing appropriate proportions of different components used in the photosensitive metal-containing composition until a homogeneous solution is obtained. The components are mixed in a clean container which can block UV light. The solutions are filtered through appropriate filter media such as PTFE, nylon, polypropylene, surface treated polyethylene or polypropylene, etc. The nominal pore size of the filter media is <5 µm.

Another embodiment is a process for applying or casting the composition in the form of a film or a three-dimensional article and curing said film or article. The composition is applied uniformly onto a suitable substrate, such as metal, plastic, wood, paper, glass, and ceramic, by known coating methods. For example, the coatings may be applied by dipping (or dip coating), knife coating, lamination, brushing, spraying, spin-coating, die coating, micro-gravure coating, cast-transfer or reverse-roll coating. After the coating operation, the solvent is generally removed by drying. The drying step is typically a heating step where the coating and substrate are heated to a temperature of about 50° C. to 150° C. for about a few seconds to a few minutes; preferably for about 5 seconds to 30 minutes depending on the thickness, the heating element, and end use of the coating. The thickness range of the dried coating generally covers values less than 10 mm.

In embodiments, the composition is applied uniformly onto a suitable substrate, such as semiconducting materials including silicon, gallium arsenide, etc. The substrate may be planar, patterned or 3-dimensional. The composition may also be applied by drop-dispense techniques where only a small amount of the composition is applied in a specified area.

After applying the photosensitive metal-containing composition to a substrate, the process of the above embodiments further comprises a drying step is employed to drive off any organic solvent or other volatile materials to form a uniform defect-free coating.

An example of a drying step is heating at a temperature is in the range of about 40° C. to 200° C. for about a few seconds to a few minutes.

A three-dimensional article can be cast from the composition by employing a suitable molding technique.

For the production of cured films or articles, the cast film or article can be exposed to a high energy radiation source. Radiation sources which can be used are all sources that emit radiation to which the suitable catalyst or initiator is sensitive. Examples include high pressure mercury lamp, excimer lasers, electron beams, and x-rays sources. Total exposure time vary from about 5 seconds to 30 minutes depending on intensity of the radiation, thickness of coating, nature of the metal-containing precursor unit (MU) and the prepolymer unit (PU), and sensitivity of the catalyst or initiator used. The composition may be exposed to radiation whether it is in a solvent-containing state or in a solvent-free state after evaporating the solvent fraction. A fully cured film or article does not show any solubility in acetone as determined by mechanically rubbing a cotton swab soaked in acetone. Depending on the application, a post-curing bake may be required.

After applying the photosensitive metal-containing composition to a substrate and drying the photosensitive metal-containing composition, the process of the above embodiments further comprises exposing the photosensitive metal-containing composition to actinic radiation source. When the photosensitive metal-containing composition is exposed to actinic radiation, the photoactive catalyst or photoinitiator induces combining reactions of reactive functional groups on the metal-containing precursor unit renders the exposed region of the composition insoluble in solvent, leaving the unexposed portion of the composition soluble. An example of actinic radiation is light (broadband or specific wavelength from about 0.01 nm to about 600 nm). Examples of actinic light sources include high pressure mercury lamp, excimer lasers, electron beam, and x-ray sources.

Total exposure time vary from about 5 seconds to 30 minutes depending on intensity of the radiation, thickness and nature of the photosensitive metal-containing composition and sensitivity of the photoactive catalyst or photoinitiator used. The composition may be exposed to radiation whether it is in a solvent-containing state or in a solvent-free state after evaporating the solvent fraction.

Alternatively, a cured film or article can be produced by heating the cast film or article to a temperature of about 50° C. to 300° C. for about a few seconds to a few minutes; preferably for about 5 seconds to 30 minutes depending on the thickness of coating, nature of the metal-containing precursor (MU) and the prepolymer unit (PU), and efficiency of the catalyst or initiator.

Another embodiment is an optically clear film or article. The film or article typically has transparency greater than ninety percent, an index of refraction in the range of 1.4 to 1.8 in the 400-700 nm range of light and 1.4 to 2.4 in the 150-400 nm range of light. Unless modified with a dye, the film and article of this invention show no coloration in the visible range of light. The cured film has good retention of optical clarity and does not change color upon storage. The cured film also shows excellent adhesion to a variety of substrates such as silicon, metal, wood, and other plastics or films such as polyethylene terephthalate (PET) or triacetyl cellulose (TAC) to form laminates and composites. The cured films and the articles also show excellent hardness, scratch resistance, and resistance to most of organic solvents.

In another embodiment a process is provided for producing metal-containing films, three-dimensional objects or articles via photochemical reactions of suitable photosensitive metal-containing compositions. The process comprises applying the photosensitive metal-containing compositions on to a substrate, drying the photosensitive metal-containing composition, sometimes at a temperature between 40 and 200° C. and exposing the photosensitive metal-containing composition to actinic radiation. The process further comprises applying a post-treatment selected individually or in combination from a thermal, chemical or plasma treatment producing metal-containing films, three-dimensional objects or articles comprising $M_zE_v$, where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine; where z is about 5 to about 95%, or about 15% to about 95%, or about 25% to about 95% and z+v is 100%. The process further comprises producing metal-containing films, three-dimensional objects or articles producing metal-containing films, three-dimensional objects or articles with index of refraction in the range of 1.4 to 2.2 in the 400-900 nm range of light and 1.4 to 2.4 in the 150-400 nm range of light The process also provides metal-containing films, three-dimensional objects or articles with dielectric constant of at least 2.

In another embodiment, a process for producing patterned metal-containing films, three-dimensional objects or articles via photochemical reactions of suitable so photosensitive metal-containing compositions is described. The process comprises applying the photosensitive metal-containing compositions on to a substrate, drying the photosensitive metal-containing composition, sometimes at a temperature between 40 and 200° C. for about a few seconds to a few minutes, exposing the photosensitive metal-containing composition to actinic radiation through an appropriate photomask and developing away the unexposed region of the composition. The process further comprises applying a post-treatment selected individually or in combination from a thermal, chemical or plasma treatment producing metal-containing films, three-dimensional objects or articles comprising $M_zE_v$, where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine; where z is about 5 to about 95% and z+v is 100%. The process further comprises producing metal-containing films, three-dimensional objects or articles with index of refraction in is the range of 1.4 to 2.2 in the 400-900 nm range of light and 1.4 to 2.4 in the 150-400 nm range of light. The process also provides metal-containing films, three-dimensional objects or articles with dielectric constant of at least 2.

The process described in the patterning embodiment comprises exposing the photosensitive metal-containing composition to actinic radiation through an appropriate photomask. A photomask is an opaque substrate with transparent patterns such as holes, lines, and spaces that allow light to shine through. An example of a photomask is a transparent fused silica, calcium fluoride or magnesium fluoride blank covered with a chrome pattern.

After applying the photosensitive metal-containing composition to a substrate, drying the photosensitive metal-containing composition and exposing of the photosensitive metal-containing composition to actinic radiation, the next step in the process described in the second embodiment comprises developing of the unexposed portion of the composition by applying a suitable solvent. The unexposed regions of the composition are soluble in solvent and dissolve away, leaving a pattern. The solvent may be applied to the substrate by spraying, dipping or puddling. The total contact time with the solvent can vary from a few seconds to a few minutes. The time needed to dissolve unexposed regions of the composition would determine the suitable solvent. Suitable solvents for developing the unexposed regions of the composition may be selected individually or in combination from non-aqueous solvents such as ketones, ethers, esters and alcohols as well as aqueous alkaline and aqueous acidic solutions. Examples of ketones, ethers, and esters include 2-butanone, 3-methyl-2-butanone, 2-heptanone, cyclopentanone, cyclohexanone, 2-methoxy-1-propylene acetate, 2-methoxyethanol, 2-ethoxyethanol, 2-ethoxyethyl acetate, 1-methoxy-2-propyl acetate, 1,2-dimethoxy ethane ethyl acetate, cellosolve acetate, methyl lactate, ethyl lactate, n-butyl acetate, methyl pyruvate, ethyl pyruvate, methyl 3-methoxypropionate, ethyl 3-methoxypropionate, N-methyl-2-pyrrolidone, 1,4-dioxane, ethylene glycol monoisopropyl ether, diethylene glycol monoethyl ether, diethylene glycol monomethyl ether, diethylene glycol dimethyl ether, and the like. Examples of alcohol solvents include methanol, ethanol, 1-propanol, 2-propanol, butanol, and the like.

After the development step, any residual solvent and other volatile components may be removed by applying a drying step. Examples of a drying step include spin-drying or at temperature in the range of about 40° C. to 200° C. for about a few seconds to a few minutes.

After applying the photosensitive metal-containing composition to a substrate, drying the photosensitive metal-containing, exposing of the photosensitive metal-containing composition to actinic radiation and developing the unexposed portion of the composition, the next step in the process described in the above embodiments further comprises applying a post-treatment selected individually or in combination from a thermal, chemical or plasma treatment. The resulting metal-containing film, article or three-dimensional object comprises $M_zE_v$, where M is metal as described in Structure I; E is selected individually or in combination from a group of elements such as oxygen, hydrogen, nitrogen, sulfur, carbon, silicon or fluorine; where z is about 5 to about 95% and z+v is 100%. In some cases the post-treatment results in a change of refractive index for the metal-containing film, article or three-dimensional object of at least about ±0.1, or a refractive index change of at least about ±0.2 or refractive index change of at least about ±0.25. The process including a post-treatment produces metal-containing films, articles or three-dimensional objects with index of refraction in the range of 1.4 to 2.2 in the 400-900 nm range of light and 1.4 to 2.4 in the 150-400 nm range of light. The process also provides metal-containing films, three-dimensional objects or articles with dielectric constant of at least 2.

An alternative process for producing patterned metal-containing films comprises applying photosensitive metal-containing composition on to a substrate, imprinting the photosensitive metal-containing composition with a template which could be in the form of a stamp or a dye or a mold, exposing the imprinted photosensitive metal-containing composition to actinic radiation in the form of light or heat. The process is referenced as 'imprint lithography' The metal-containing composition used for imprint lithography is not necessarily photosensitive and heat can be used to induce combining reaction resulting in change of solubility behavior of the imprinted composition before and after heating. A thermally activated initiator or catalyst as an essential part of the metal-containing composition. Imprint lithography can also be performed using a photosensitive metal-containing composition, where a photoinitiator or a photoactive catalyst is used. The template used in the process may be transparent to the actinic light in order to expose the composition before removing the template. The process further comprises applying a post-treatment selected individually or in combination from a thermal, chemical or plasma treatment producing metal-containing films, three-dimensional objects or articles comprising MzEv, where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine; where z is about 5 to about 95% and z+v is 100%. The process further comprises for producing metal-containing films, three-dimensional objects or articles with index of refraction in the range of 1.4 to 2.2 in the 400-900 nm range of light and 1.4 to 2.4 in the 150-400 nm range of light. The process also provides metal-containing films, three-dimensional objects or articles with dielectric constant of at least 2. A general description of imprint technology is described in U.S. Pat. Nos. 5,772,905 and 6,334,960 and are incorporated herein as reference.

Non-limiting examples of thermal treatment involve elevated temperatures (typically greater than 200° C.) to the metal-containing compositions in vacuum or in the presence of a suitable atmosphere such as air, oxygen, nitrogen, etc.

One non-limiting example of a chemical treatment is employing ozone treatment.

One non-limiting example of a plasma treatment is employing oxygen plasma.

The embodiments described herein also include a metal-containing film, three-dimensional object or article formed by the photosensitive metal-containing compositions and the processes described above.

The disclosed embodiments also include a coated, a laminated, or a molded article formed by the photosensitive metal-containing compositions and the processes described above.

The disclosed embodiments further include a microdevice formed by the photosensitive metal-containing compositions and the processes described above.

EXAMPLES

The invention is further illustrated by, but not limited to, the following examples.

Preparative Example 1

In a 250-mL amber bottle, urethane acrylate oligomer, U1, Catalog No. CN9010 from Sartomer Company (90 g) was dissolved in ethyl acetate (60 g). The resulting mixture was homogeneous and clear after 20 minutes of rolling on a two mill roller at maximum speed.

Comparative Example 1

An ethyl acetate solution of urethane acrylate oligomer, U1, as prepared in Preparative Example 1 (1.52 g) was added to a 2-dram amber vial containing 1[4-(phenylthio)phenyl]-2-(O-benzoyloxime) 1,2-octanedione, Irgacure OXE-01 from Ciba Specialty Chemicals (0.05 g). Additional ethyl acetate (0.71 g) was added to adjust the concentration to 40% solids. The resulting mixture was homogeneous after 5 minutes of mixing with a magnetic stir bar on a magnetic stirrer set to the maximum speed. The homogeneous and clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No, AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

Preparative Example 2

In a 2-dram amber vial, dipentaerythritol penta-/hexaacrylate, Catalog No. 407283 from Aldrich Chemical Company (4.0 g), was dissolved in ethyl acetate (2.0 g). The resulting mixture was homogeneous and clear after 20 minutes of rolling on a two mill roller at maximum speed.

Comparative Example 2

An ethyl acetate solution of dipentaerythritol penta-/hexaacrylate as prepared in Preparative Example 2 (1.98 g) was added to a 2-dram amber vial containing 1-hydroxy-cyclohexyl-phenyl-ketone, Irgacure 184 from Ciba Specialty Chemicals (0.06 g) and bis(2,4,6-trimethylbenzoyl)-phenylphosphineoxide, Irgacure 819 from Ciba Specialty Chemicals (0.02 g). Additional ethyl acetate (0.96 g) was added to adjust the concentration to 40% solids. The resulting mixture was homogeneous and clear after 5 minutes of agitation. The homogeneous solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

Preparative Example 3

In this preparative example, a stock solution of diurethane dimethacrylate was prepared along with photoinitiator. The stock solution prepared here is used in experiments of Comparative Example 3 and Examples 5 and 6. Accordingly, in a 15-mL amber bottle, a mixture of diurethane dimethacrylate, isomer mixture, Catalog No. 436909 from Aldrich Chemical Company (2.35 g) and bis(eta5-2,4-cyclopentadien-1-yl)bis[2,6-difluoro-3-(1H-pyrrol-1-yl)phenyl]titanium, Irgacure 784 from Ciba Specialty Chemicals (0.12 g), was dissolved in 2-butanone (3.53 g). The resulting mixture was homogeneous and clear after 5 minutes of mixing with a magnetic stir bar on a magnetic stirrer set to the maximum speed.

Comparative Example 3

A solution of diurethane dimethacrylate and photoinitiator in 2-butanone as prepared in Preparative Example 3 (0.98 g) was added to a 2-dram amber vial containing zirconium oxide nanopowder (20-30 nm particle size), Catalog No. 544760 from Aldrich Chemical Company (0.04 g). Additional 2-butanone (1.23 g) was added to the amber vial to adjust the concentration to 20% solids. The resulting dispersion was mixed for 5 minutes with a magnetic stir bar on a magnetic stirrer set to the maximum speed, but no homogeneous dispersion was achieved. An attempt was made to further homogenize the mixture by rolling it on a two mill roller for 12 hours, but solid settled within 10 minutes upon storage. The dispersion was filtered through 0.2 µm filter into a clean amber vial to remove insoluble material, but the solution remained hazy and more insoluble material appeared within one hour making the solution unstable for practical use.

Based on this observation, it was concluded that 20-30 nm zirconium oxide nanopowder was not dispersible or compatible with diurethane dimethacrylate hence, was not suitable for forming an optically clear film or article.

Example 1

An ethyl acetate solution of urethane acrylate oligomer, U1, as prepared in Preparative Example 1 (1.32 g) was added to a 2-dram amber vial containing zirconyl dimethacrylate, Catalog No. CXZR051 from Gelest, Inc (0.09 g), and 1-[4-(phenylthio) phenyl]-2-(O-benzoyloxime) 1,2-octanedione, Irgacure OXE-01 from Ciba Specialty Chemicals (0.04 g). Additional ethyl acetate (0.74 g) was added to adjust the concentration to 40% solids. The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 10 weight percent of zirconyl dimethacrylate formed a homogeneous solution, which was stable for at least 6 months upon storage at RT (23° C.). Addition of zirconyl dimethacrylate did not result in any loss of transparency compared to cured film of urethane acrylate oligomer, U1, of Comparative Example 1, and resulted in an improved refractive index.

Preparative Example 4

In a 100-mL amber bottle, zirconyl dimethacrylate, Catalog No. CXZR051 from Gelest, Inc. (30 g), was dissolved in ethyl acetate (30 g). The resulting mixture was homogeneous and clear after 5 hours of rolling on a two mill roller at maximum speed.

Example 2

An ethyl acetate solution of urethane acrylate oligomer, U1, as prepared in Preparative Example 1 (1.40 g) and a solution of zirconyl dimethacrylate as prepared in Preparative Example 4 (0.72 g) were added to a 2-dram amber vial containing 1-hydroxy-cyclohexyl-phenyl-ketone, Irgacure 184 from Ciba Specialty Chemicals (0.06 g), and bis(2,4,6-trimethylbenzoyl)-phenylphosphineoxide, Irgacure 819 from Ciba Specialty Chemicals (0.01 g). Additional ethyl acetate (1.74 g) was added to adjust the concentration to 40% solids. The resulting mixture was homogeneous and clear after 5 minutes of agitation. The homogeneous solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table.

In this example, formulation containing 30 weight percent of zirconyl so dimethacrylate formed a homogeneous solution, which was stable for at least 6 months upon storage at RT (23° C.). Addition of zirconyl dimethacrylate did not result in any loss of transparency compared to cured film of urethane acrylate oligomer, U1, of Comparative Example 1.

Example 3

An ethyl acetate solution of urethane acrylate oligomer, U1, as prepared in Preparative Example 1 (0.20 g) and solution of zirconyl dimethacrylate as prepared in Preparative Example 4 (2.14 g) were added to a 2-dram amber vial containing 1-hydroxy-cyclohexyl-phenyl-ketone, Irgacure 184 from Ciba Specialty Chemicals (0.06 g). Additional ethyl acetate (0.69 g) was added to adjust the concentration to 39% solids. The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, formulation containing 90 weight percent of zirconyl dimethacrylate formed a homogeneous solution, which was stable for at least 6 months upon storage at RT (23° C.) Addition of zirconyl dimethacrylate did not result in any loss of transparency compared to cured film of urethane acrylate oligomer, U1, of Comparative Example 1.

Example 4

An ethyl acetate solution of dipentaerythritol penta-/hexa-acrylate as prepared in Preparative Example 2 (1.42 g) and an ethyl acetate solution of zirconyl dimethacrylate as prepared in Preparative Example 4 (0.74 g) were added to a 2-dram amber vial containing 1-hydroxy-cyclohexyl-phenyl-ketone, Irgacure 184 from Ciba Specialty Chemicals (0.06 g), and bis(2,4,6-trimethylbenzoyl)-phenylphosphineoxide, Irgacure 819 from Ciba Specialty Chemicals (0.02 g). Additional ethyl acetate (0.82 g) was added to adjust the concentration to 40% solids The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 30 weight percent of zirconyl dimethacrylate formed a homogeneous solution with dipentaerythritol penta-/hexa-acrylate. The solution was stable for at least 6 months upon storage at RT (23° C.). Addition of zirconyl dimethacrylate did not result in any loss of transparency compared to cured film of dipentaerythritol penta-/hexa-methacrylate of Comparative Example 2.

Example 5

A solution of diurethane dimethacrylate and photoinitiator in 2-butanone as prepared in Preparative Example 3 (0.97 g) was added to a 2-dram amber vial containing zinc methacrylate, Catalog No. CXZN050 from Gelest, Inc. (0.04 g). Additional 2-butanone (1.24 g) was added to adjust concentration to 20% solids. Sample was agitated for 5 minutes, and then rolled for 12 hours. The resulting dispersion was mixed for 5 minutes with a magnetic stir bar on a magnetic stirrer set to the maximum speed. A portion of solid zinc methacrylate remained un-dissolved upon prolonged mixing of 4 hours. The resulting mixture was filtered through a 0.2 µm filter into a clean amber vial. The residue was about 3 weight percent. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its chemical resistance (see Table 1). The refractive index is reported in Table 2. In this example, although a formulation containing 10 weight percent of zinc methacrylate did not form a homogeneous solution, a formulation containing 7 weight percent was stable for at least 2 months upon storage at RT (23° C.).

Example 6

In a 15-mL amber bottle, a mixture of diurethane dimethacrylate, isomer mixture, Catalog No 436909 from Aldrich Chemical Company (0.60 g), 1-hydroxy-cyclohexyl-phenyl-ketone, Irgacure 184 from Ciba Specialty Chemicals (0.02 g), and titanium methacrylate triisopropoxide, Catalog No. AKT877 from Gelest, Inc (0.07 g), were dissolved in 2-butanone (1.45 g). Additional 2-butanone (1.31 g) was added to adjust the concentration to 20% solids. The resulting mixture was homogeneous and clear after 5 minutes of agitation. The clear solution was filtered through a 0.2 μm PTFE syringe filter to remove any extraneous impurities such as dust particles. The solution was spin-coated onto a bare silicon wafer (4" diameter) and dried for 120 seconds at 100° C. in an oven to a thickness of 4.2 μm. This dried film was cured by a Blak-ray UV lamp Model 100 AP and then tested to determine its chemical resistance (see Table 1). The refractive index is reported in Table 2.

In this example, formulation containing 10 weight percent of titanium methacrylate triisopropoxide formed a homogeneous solution, which was stable for at least 2 months upon storage at RT (23° C.).

Example 7

An ethyl acetate solution of urethane acrylate oligomer, U1, as prepared in Preparative Example 1 (1.21 g) was added to a 2-dram amber vial containing a 50% zirconium diacrylate dibutoxide in ethyl acetate solution from Gelest, Inc. (0.97 g) and 1-hydroxy-cyclohexyl-phenyl-ketone, Irgacure 184 from Ciba Specialty Chemicals (0.06 g). Additional ethyl acetate (1.22 g) was added to adjust concentration to 35% solids. The resulting mixture was homogeneous but slightly hazy after 2 hours of agitation. The homogeneous solution was filtered through a 0.2 μm PTFE syringe filter to remove any extraneous impurities such as dust particles. The clear solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 40 weight percent of zirconium diacrylate dibutoxide formed a homogeneous solution with urethane acrylate oligomer. The solution was stable for at least 3 months upon storage at RT (23° C.) Addition of zirconium diacrylate dibutoxide did not result in any loss of transparency compared to cured film of urethane acrylate oligomer, U1, of Comparative Example 1

Preparative Example 5

In a 60-mL amber bottle, urethane acrylate oligomer, U1, (6.9 g), was dissolved in 2-butanone (4.6 g). The resulting mixture was homogeneous and clear after 20 minutes of rolling on a two mill roller at maximum speed.

Preparative Example 6

In a 100-mL one-neck round bottom flask equipped with a stir bar and a rubber septum, hafnium n-butoxide, Catalog No. AKH325 from Gelest, Inc. (15.42 g) was cooled in an ice bath to 5° C. Acrylic acid, Catalog No 147230 from Aldrich Co (9.92 g) was added dropwise to the flask by syringe over a period of 45 minutes. The solution was stirred at room temperature for 12 hours then rotovapped at 40° C. for 1 hour. The residue was dried under vacuum at 50° C. for 2 hours in a vacuum oven.

Example 8

A 2-butanone solution of urethane acrylate oligomer, U1, as prepared in Preparative Example 5 (1.08 g) was added to a 2-dram amber vial containing hafnium acrylate synthesized in Preparative Example 6 (0.35 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (1.01 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No, AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero are reported in Table 2.

In this example, 35 weight percent of hafnium acrylate formed a homogeneous solution with urethane acrylate oligomer, U1. Addition of hafnium acrylate did not result in any loss of transparency compared to cured film of urethane acrylate oligomer, U1, of Comparative Example 1

Example 9

An ethyl acetate solution of urethane acrylate oligomer, U1, as prepared in Preparative Example 1 (1.20 g) and an ethyl acetate solution of zirconyl dimethacrylate as prepared in Preparative Example 4 (0.48 g) was added to a 2-dram amber vial containing a 50% zirconium diacrylate dibutoxide in ethyl acetate solution from Gelest, Inc (0.49 g) and 1-hydroxy-1-cyclohexyl-phenyl-ketone, Irgacure 184 from Ciba Specialty Chemicals (0.06 g). Additional ethyl acetate (1.21 g) was added to adjust concentration to 35% solids. The resulting mixture was homogeneous and clear after 5 minutes of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No, AR-4103 from BYK Gardner to a wet film thickness of about 5 μm and dried for 120 seconds at 80° C. in an oven This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

This is an example where two types of metal-containing precursor units were used in combination. The formulation containing 20 weight percent each of zirconyl dimethacrylate and zirconium diacrylate dibutoxide formed clear solution.

The solution was stable for at least 4 months. Addition of zirconyl dimethacrylate and zirconium diacrylate dibutoxide did not result in any loss of transparency compared to cured film of urethane acrylate oligomer, U1, of Comparative Example 1.

Preparative Example 7

In a 120-mL amber bottle, zirconyl dimethacrylate, Catalog No. CXZR051 from Gelest, Inc. (21 g), was dissolved in 2-butanone (31 g). The resulting mixture was homogeneous and clear after 5 hours of rolling on a two mill roller at maximum speed.

Example 10

A 2-butanone solution of urethane acrylate oligomer, U1 as prepared in Preparative Example 5 (0.99 g) and a solution of zirconyl dimethacrylate as prepared in Preparative Example 7 (0.34 g) were added to a 2-dram amber vial containing hafnium acrylate synthesized in Preparative Example 6 (0.20 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.91 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

This is an example where two types of metal-containing precursor units were used in combination. The formulation containing 20 weight percent each of zirconyl dimethacrylate and hafnium acrylate formed clear solution. The solution was stable for at least 1 month. Addition of zirconyl dimethacrylate and hafnium acrylate did not result in any loss of transparency compared to cured film of urethane acrylate oligomer, U1, of Comparative Example 1.

Preparative Example 8

In a 60-mL amber bottle, another variety of urethane acrylate oligomer, U2, Catalog No. NTX7295 from Sartomer Company (30 g) was dissolved in 2-butanone (20 g). The resulting mixture was homogeneous and clear after 45 minutes of rolling on a two mill roller at maximum speed.

Example 11

A 2-butanone solution of urethane acrylate oligomer, U2, as prepared in Preparative Example 8 (1.03 g) and a solution of zirconyl dimethacrylate as prepared in Preparative Example 7 (0.33 g) were added to a 2-dram amber vial containing hafnium acrylate as synthesized in Preparative Example 6 (0.21 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.89 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor I PET film from Toray (75 μm thick) with a wire-wound coater (3 mil diameter), Catalog No. AR-4103 from BYK Gardner to a wet film thickness of about 5 μm and dried for 120 seconds at 80° C. in an oven. The dried, uncured film was hazy. The percent transmittance values of the cured film measured at 420, 530, and 650 nm at time zero are reported in Table 2.

The results of Example 11 show that a formulation with a different variety of urethane acrylate oligomer, U2, was not found to be compatible with the metal precursor units, zirconyl dimethacrylate and hafnium acrylate as determined by less than 80% transmittance of the film formed from this composition. In comparison, U1 shows excellent compatibility in a similar composition as shown in Example 10.

Example 12

A 2-butanone solution of urethane acrylate oligomer, U1, as prepared in Preparative Example 5 (0.66 g), a solution of urethane acrylate oligomer, U2, as prepared in Preparative Example 8 (0.34 g), and a solution of zirconyl dimethacrylate as prepared in Preparative Example 7 (0.33 g) were added to a 2-dram amber vial containing hafnium acrylate as synthesized in Preparative Example 6 (0.20 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g) Additional 2-butanone (0.90 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was 145 coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

The film formed by the composition of Example 12 shows % transmittance of >90 (Table 2) suggesting that a blend of two types of urethane acrylate oligomers, U2 and U1 shows better compatibility with zirconyl methacrylate and hafnium acrylate than the composition of Example 11 where only U2 was used and % transmittance of the film was <80.

Preparative Example 9

In a 100-mL one-neck round bottom flask equipped with a stir bar and a rubber septum, zirconium n-butoxide (80% in n-butanol), Catalog No. AKZ945 from Gelest, Inc. (12.78 g) was cooled in an ice bath to 5° C. Acrylic acid, Catalog No. 147230 from Aldrich Co. (8.06 g) was added dropwise to the flask by syringe over a period of 45 minutes. The solution was stirred at room temperature for 12 hours then rotovapped at 40° C. for 1 hour. The residue was dried under vacuum at 50° C. for 2 hours in a vacuum oven.

Example 13

A 2-butanone solution of urethane acrylate oligomer, U1, as prepared in Preparative Example 5 (1.03 g) and a solution of zirconyl dimethacrylate as prepared in Preparative Example 7 (0.33 g) were added to a 2-dram amber vial containing zirconium acrylate synthesized in Preparative Example 9 (0.20 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.91 g) was added to adjust the concentration to 40% solids. The resulting mixture was homogeneous and clear after 24 hours of agitation. The clear solution was filtered through a 0.2 µm PTFE syringe filter to remove any extraneous impurities such as dust particles The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

This is an example where two metal-containing precursor units were used in combination. The formulation containing 20 weight percent each of zirconyl dimethacrylate and zirconium acrylate formed clear solution. The solution was stable for at least 1 month. Addition of zirconyl dimethacrylate and zirconium acrylate did not result in any loss of transparency compared to cured film of urethane acrylate oligomer of Comparative Example 1.

Example 14

An ethyl acetate solution of zirconyl dimethacrylate as prepared in Preparative Example 4 (1.60 g) was added to a 2-dram amber vial containing 1-hydroxy-cyclohexyl-phenyl-ketone, Irgacure 184 from Ciba Specialty Chemicals (0.04 g). Additional ethyl acetate (0.66 g) was added to adjust the concentration to 35% solids. The resulting mixture was homogeneous and clear after 5 minutes of agitation. The clear solution was filtered through a 0.2 µm PTFE syringe filter to remove any extraneous impurities such as dust particles. The filtered solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2

In this example, a transparent cured film was formed by zirconyl dimethacrylate without a prepolymer unit such as urethane acrylate oligomer and the film showed no loss of transparency after 3 months of storage.

Example 15

In a 2-dram amber vial, a mixture of a 50% zirconium diacrylate dibutoxide in ethyl acetate solution from Gelest, Inc. (1.61 g) and 1-hydroxy-cyclohexyl-phenyl-ketone, Irgacure 184 from Ciba Specialty Chemicals (0.04 g), was diluted in ethyl acetate (0.66 g). The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven This dried film was cured by a Blak-ray UV lamp Model 100 AP and then tested to determine its transparency, hardness, refractive index, and scratch resistance (see Table 1) The percent transmittance values of the cured film measured at 420, 530, and 650 nm at time zero and after storage for 120 days at 23° C., as well as refractive index are reported in Table 2.

In this example, zirconium diacrylate dibutoxide formed a transparent cured film without a prepolymer unit such as urethane acrylate oligomer and the film showed no loss of transparency after 3 months of storage.

Example 16

In a 2-dram amber vial, a mixture of hafnium acrylate as synthesized in Preparative Example 6 (1.00 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g), was dissolved in 2-butanone (1.52 g) to the concentration to 40% solids. The resulting to mixture was homogeneous and clear after 24 hours of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an is oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero are reported in Table 2.

In this example, a transparent cured film was formed by hafnium acrylate without a prepolymer unit such as urethane acrylate oligomer and the film did not show any loss of transparency for at least one month of storage.

Example 17

Prophetic

A homogeneous solution of titanasilasesquioxane of the type shown in Structure XIV is prepared by dissolving a portion of the compound (0.30 g) in ethyl acetate (0.30 g). This solution is added to a homogeneous solution of diurethane dimethacrylate (0.70 g) in ethyl acetate (0.47 g) in proportion so that the final mixture contains titanasilasesquioxane (30% by weight). Irgacure 184,1-hydroxy-cyclohexyl-phenyl-ketone (0.05 g), is added. Solution is adjusted to a concentration to 35% solids with ethyl acetate (0.68 g). The resulting mixture is homogeneous after 48 hours of agitation. The homogeneous solution is filtered through a 0.2 µm PTFE syringe filter to remove any extraneous impurities such as dust particles. The filtered solution is coated onto a Luminor T PET film from Toray (75 µm thick) with a wire-wound coater (3 mil diameter), Catalog No AR-4103 from BYK Gardner to a wet film thickness of about 5 µm and dried for 120 seconds at 80° C. in an oven. This dried film is cured by a Blak-ray UV lamp Model 100 AP.

Completion of the curing reaction for all the films in the above examples up through and including Example 16 was determined by mechanically rubbing a cotton swab soaked in acetone. Fully cured films did not show any solubility in acetone. This test was also performed to test the chemical resistance of a given formulation. If no damage was observed by the naked eye, the coating is evaluated as "pass", otherwise the coating is evaluated as "fail".

Relative scratch resistance of a film was measured by scratching the coated PET film with fine steel wool (Grade #0000) four times with a load of 400 g. The naked eye observed range of scratch resistance is from 1 to 3 where 1 is excellent (no scratches), 2 is fair (some scratching), and 3 is poor (severe scratching). Pencil hardness of a film was measured by pencils of different hardness starting with 4H and decreasing in hardness to 6B until pencil did not mark film as determined with the naked eye. Transparency of a film was measured using a UVN is Spectrophotometer at wavelengths of 420 nm, 530 nm and 650 nm. Refractive index measurements were performed using a Metricon Gadolinium Garnet Prism Model 2010 or an Atago Abbe Refractometer model NAR-1T.

TABLE 1

| Example No. | Relative Scratch Resistance (Rating 0-3) | Pencil Hardness (Rating 4H-6B) | Chemical Resistance (pass or fail) |
|---|---|---|---|
| PET | 3 | 2B | pass |
| Comparative 1 | 1 | 4H | pass |
| Comparative 2 | 1 | 3H | pass |
| 1 | 1 | 4H | pass |
| 2 | 2 | 4H | pass |
| 3 | 3 | 3B | pass |
| 4 | 1 | 2H | pass |
| 5 | Not measured | Not measured | pass |
| 6 | Not measured | Not measured | pass |
| 7 | 2 | HB | pass |
| 8 | 0 | 4H | pass |
| 9 | 2 | 2H | pass |
| 10 | 1 | 3H | pass |
| 12 | 1 | 4H | pass |
| 13 | 1 | 2H | pass |
| 14 | 3 | 3B | pass |
| 15 | 2 | 2B | pass |
| 16 | 3 | 4B | pass |

Comparative Example 4

The following example compares materials used in solgel and CVD technology using the process.

Sample Preparation: A solution of zirconium n-butoxide (80 wt % in n-butanol from Sigma-Aldrich Corp.) was diluted to 25 wt % with n-butanol. The resulting mixture was homogeneous after stirring. The homogeneous and clear solution was filtered through a 1.0 μm PTFE syringe filter. The solution was spin-coated onto a 1" silicon wafers at wet coating thickness of about 1.2 μm and dried for 60 seconds at 130° C. on a hotplate.

The coating became opaque white powder that easily flaked off the substrate. The coating quality demonstrates that zirconium n-butoxide would not be stable for the subsequent steps of the process and is therefore an unsuitable material for this process.

Examples 18-31

The following examples demonstrate photosensitivity of the photosensitive metal-containing compositions by comparing the material with and without photoinitiator.

Sample Preparation: Each solution was prepared by dissolving the metal-containing precursor unit (MU) in the solvent or solvent combination as listed in Table 3 (15 wt % in solution). The examples with photoinitiator contain 8.8 wt % (based on weight of MU) of 1-hydroxy-cyclohexyl-phenyl-ketone, Irgacure 184 from Ciba Specialty Chemicals and 1.2 wt % (based on weight of MU) of bis(2,4,6-trimethylbenzoyl)-phenylphosphineoxide, Irgacure 819 from Ciba Specialty Chemicals. The resulting mixture was homogeneous 2H after stirring. The homogeneous solution was filtered through a 1.0 μm PTFE syringe filter. These solutions were used in the IR and Solubility Tests.

IR Test: The solutions prepared above were individually tested by applying to a 1" NaCl plate and drying for 30 seconds with a heat gun. Each dried composition was analyzed by an infrared spectrometer between 4000 and 600

TABLE 2

| | Time zero | | | Time 120 days | | | Refractive |
|---|---|---|---|---|---|---|---|
| Example No. | % T at 420 nm | % T at 530 nm | % T at 650 nm | % T at 420 nm | % T at 530 nm | % T at 650 nm | Index of Film at 532 nm[a] |
| PET | 100.0 | 99.6 | 99.5 | 100.0 | 99.6 | 99.4 | 1.70 |
| Comparative 1 | 100.0 | 99.4 | 99.5 | 100.0 | 99.4 | 99.4 | 1.49 |
| Comparative 2 | 100.0 | 99.4 | 99.3 | 100.0 | 99.4 | 99.5 | 1.49 |
| 1 | 99.7 | 99.4 | 99.3 | 99.6 | 99.4 | 99.4 | 1.53 |
| 2 | 99.5 | 99.2 | 99.1 | 99.6 | 99.1 | 99.0 | 1.55 |
| 3 | 99.3 | 99.1 | 99.0 | 99.4 | 99.2 | 99.1 | 1.57 |
| 4 | 99.6 | 99.3 | 99.2 | 99.7 | 99.4 | 99.2 | 1.55 |
| 5 | | | | Not measured | | | 1.46[b] |
| 6 | | | | Not measured | | | 1.49[b] |
| 7 | 99.4 | 99.2 | 99.1 | 99.5 | 99.3 | 99.2 | 1.56 |
| 8 | 99.7 | 99.4 | 99.3 | | Not measured | | |
| 9 | 99.6 | 99.3 | 99.2 | 99.7 | 99.4 | 99.2 | 1.56 |
| 10 | 99.7 | 99.4 | 99.3 | | Not measured | | 1.63 |
| 11 | 66.4 | 75.1 | 79.2 | | Not measured | | |
| 12 | 99.8 | 99.6 | 99.5 | | Not measured | | 1.62 |
| 13 | 99.5 | 99.2 | 99.1 | | Not measured | | 1.58 |
| 14 | 99.2 | 99.0 | 98.9 | 99.3 | 99.0 | 98.8 | 1.58 |
| 15 | 98.3 | 97.0 | 96.3 | 98.5 | 96.9 | 96.2 | 1.57 |
| 16 | 99.8 | 99.5 | 99.3 | | Not measured | | |

[a]Film applied 5 μm thick Measured by Atago Abbe Refractometer at 532 nm
[b]Refractive index measured by Metricon Gadolinium Garnet Prism on Silicon at 414 nm cm$^{-1}$. The dried composition was exposed by a Blak-ray UV lamp Model 100 AP for 15 minutes and analyzed by an infrared spectrometer for changes in C=C stretch at 1640 cm$^{-1}$.

Solubility Test: The solutions prepared above were individually tested by coating onto a Luminor T PET film from Toray (75 μm thick) with a wire-wound coater (3 mil diameter), Catalog No. AR-4103 from BYK Gardner to a wet coating thickness of about 5 μm and drying for 60 seconds at 80° C. in an oven. Each dried composition was exposed by a Blak-ray UV lamp Model 100 AP for 15 minutes. The solubility of the resulting composition was determined by mechanically rubbing a cotton swab soaked in acetone. The data are shown in Table 3.

butanol (75:25). The solution was added 10 wt % of 1-hydroxy-cyclohexyl-phenyl-ketone, Irgacure 184 from Ciba Specialty Chemicals. The resulting mixture was homogeneous after stirring. The homogeneous and clear solution was filtered through a 1.0 μm PTFE syringe filter. Each solution was dip-coated onto metal coupons that are 0.5"×1" and dried for 120 seconds at 120° C. on a hotplate Each coupon was exposed by a Blak-ray UV lamp Model 100 AP for 15 minutes. Each coupon was thermally treated at 250° C. for 30 minutes in an oven then heated to a higher temperature for 60 minutes. The type of metal coupon used, the final temperature of the thermal treatment and metal content as measured by Energy Dispersive X-ray Spectroscopy are listed in Table 4.

TABLE 3

| | | | | | |
|---|---|---|---|---|---|
| 18 | Hafnium Acrylate | Yes | 1-Methoxy-2-propanol | Peak at 1640 cm−1 reduced | Insoluble |
| 19 | Hafnium Acrylate | No | 1-Methoxy-2-propanol | No change | Soluble |
| 20 | Hafnium Carboxyethyl Acrylate | Yes | 1-Methoxy-2-propanol/n-Butanol | Peak at 1640 cm−1 reduced | Insoluble |
| 21 | Hafnium Carboxyethyl Acrylate | No | 1-Methoxy-2-propanol/n-Butanol | No change | Soluble |
| 22 | Zirconium Carboxyethyl Acrylate | Yes | 1-Methoxy-2-propanol/n-Propanol | Peak at 1640 cm−1 reduced | Insoluble |
| 23 | Zirconium Carboxyethyl Acrylate | No | 1-Methoxy-2-propanol/n-Propanol | No change | Soluble |
| 24 | Zirconium 2-bromo-5-oxo-4-oxatricyclo[4.2.1.0$^{3,7}$]nonane-9-carboxylate triacrylate | Yes | 1-Methoxy-2-propanol | Peak at 1640 cm−1 reduced | Insoluble |
| 25 | Zirconium 2-bromo-5-oxo-4-oxatricyclo[4.2.1.0$^{3,7}$]nonane-9-carboxylate triacrylate | No | 1-Methoxy-2-propanol | No change | Soluble |
| 26 | Zirconyl Dimethacrylate | Yes | 1-Methoxy-2-propanol | Peak at 1640 cm−1 reduced | Insoluble |
| 27 | Zirconyl Dimethacrylate | No | 1-Methoxy-2-propanol | No change | Soluble |
| 28 | Zirconium Acrylate | Yes | 1-Methoxy-2-propanol | Peak at 1640 cm−1 reduced | Insoluble |
| 29 | Zirconium Acrylate | No | 1-Methoxy-2-propanol | No change | Soluble |
| 30 | Zirconium Carboxyethyl Acrylate with Acryl-terminated POSS | Yes | 1-Methoxy-2-propanol/n-Propanol | Peak at 1640 cm−1 reduced | Insoluble |
| 31 | Zirconium Carboxyethyl Acrylate with Acryl-terminated POSS | No | 1-Methoxy-2-propanol/n-Propanol | No change | Soluble |

The results of Table 3 indicate that the MU of these embodiments is not photosensitive as confirmed by no change in the IR spectra of the compositions before and after exposure when no photoinitiator was used. On the contrary, a significant change in their IR and solubility characteristics was observed when MU was used in combination with photoinitiator. Combining reactions of the reactive functional groups led to change in solubility as also confirmed by the reduction of 1640 cm$^{-1}$ peak intensity in their IR spectra.

Examples 32-33

The following examples demonstrate formation of a metal-containing film through the process of applying a photosensitive metal-containing composition on steel or tungsten, drying the photosensitive metal-containing composition, exposing the photosensitive metal-containing composition to a source of UV light and applying a thermal treatment to produce a metal-containing film.

Sample Preparation: A solution was prepared by dissolving hafnium carboxyethyl acrylate (25 wt %) in 2-butanone/n-

TABLE 4

| Ex. | Type of Coupon | Final Bake T (° C.) | Hf (wt %) | O (wt %) | C (wt %) |
|---|---|---|---|---|---|
| | Initial film composition | | 24 | 34 | 38 |
| 32 | Steel | 600 | 77 | 17 | 6 |
| 33 | Tungsten | 600 | 84 | 16 | 0 |

The results of Table 4 indicate that the process of applying a photosensitive metal-containing composition on steel or tungsten, drying the photosensitive metal-containing composition, exposing the photosensitive metal-containing composition to a source of UV light and applying a thermal treatment forms a metal-containing film with a hafnium content of 77-84%. This is an example of $M_zE_v$ where M is hafnium, E is a combination of oxygen and carbon, z is 77-84% and z+v is 100%.

Examples 34-35

The following examples demonstrate producing metal-containing films with index of refraction in the range of 1.4 to 2.2 in the 400-900 nm range of through the process of applying a photosensitive metal-containing composition on silicon, drying the photosensitive metal-containing composition, exposing the photosensitive metal-containing composition to a source of UV light and applying a thermal treatment.

Sample Preparation: Each solution was prepared by dissolving the metal-containing precursor unit (MU) in the solvent or solvent combination as listed in Table 5 (25 wt % in solution). To each solution was added 10 wt % (based on weight of MU) of 1-hydroxy-cyclohexyl-phenyl-ketone, Irgacure 184 from Ciba Specialty Chemicals. The resulting mixture was homogeneous after stirring. The homogeneous and clear solution was filtered through a 0.2 µm PTFE syringe filter. Each solution was spin-coated onto four 1" silicon wafers at wet composition thickness of about 2.6 µm and dried for 60 seconds at 100° C. on a hotplate. Each wafer was exposed by a Blak-ray UV lamp Model 100 AP for 15 minutes. For each solution, one of the exposed wafers was heated to 300° C. for one hour in an oven, another exposed wafer was heated to 400° C. for one hour in an oven, a third exposed wafer was heated to 500° C. for one hour in an oven, and a fourth exposed wafer was heated to 600° C. for one hour in an oven. The refractive index and film thickness of each wafer were measured on a Gaertner Ellipsometer at 633 nm and 830 nm are listed in Table 5.

TABLE 5

| Ex. | MU | Solvent | Bake Temperature (° C.) | n at 633 nm | n at 830 nm | Film Thickness (µm) |
|---|---|---|---|---|---|---|
| 34 | Zirconium Carboxyethyl Acrylate | 2-Butanone/ n-Butanol | No Bake | 1.580 | 1.550 | 2.6 |
|   |   |   | 300 | 1.750 | 1.710 | 2.3 |
|   |   |   | 400 | 1.880 | 1.830 | 2.0 |
|   |   |   | 500 | 1.825 | 1.785 | 2.0 |
|   |   |   | 600 | 1.745 | 1.705 | 2.0 |
| 35 | Hafnium Carboxyethyl Acrylate | 2-Butanone/ n-Butanol | No Bake | 1.550 | 1.520 | 2.5 |
|   |   |   | 300 | 1.695 | 1.655 | 2.3 |
|   |   |   | 400 | 1.805 | 1.760 | 2.0 |
|   |   |   | 500 | 1.770 | 1.725 | 2.0 |
|   |   |   | 600 | 1.680 | 1.645 | 2.0 |

The results of Table 5 indicate that the process of applying a photosensitive metal-containing composition on silicon, drying the photosensitive metal-containing composition, exposing the photosensitive metal-containing composition to a source of UV light and applying a thermal treatment successfully produces metal-containing films with index of refraction in the range of 1.4 to 2.2 in the 400-900 nm range.

Examples 36-40

The following examples demonstrate the capability of the photosensitive metal-containing composition to form patterns through process of applying a photosensitive metal-containing composition on silicon, drying the photosensitive metal-containing composition, exposing the photosensitive metal-containing composition to UV light through a mask, developing the unexposed portions of the composition with solvent and applying a thermal treatment successfully produces metal-containing three-dimensional objects.

Sample Preparation: Each solution was prepared by dissolving the metal-containing precursor unit (MU) in the solvent or solvent combination as listed in Table 6 (15 wt % in solution). To each solution was added 8.8 wt % (based on weight of MU) of 1-hydroxy-cyclohexyl-phenyl-ketone, Irgacure 184 from Ciba Specialty Chemicals and 1.2 wt % (based on weight of MU) of bis(2,4,6-trimethylbenzoyl)-phenylphosphineoxide, Irgacure 819 from Ciba Specialty Chemicals. The resulting mixture was homogeneous after stirring. The homogeneous and clear solution was filtered through a 0.2 µm PTFE syringe filter The solution was spin-coated onto a 2" silicon wafer a wet thickness of about 5 µm and dried for 60 seconds at 100° C. on a hotplate. This dried composition was exposed through a binary photomask with feature sizes 40 to 5 µm by a Blak-ray UV lamp Model 100 AP for 15 minutes. The unexposed regions of the composition were developed away by rinsing with acetone for 60 seconds. The patterned wafer was heated to 200° C. for 5 minutes. The patterned wafer was examined under a microscope set from 500 to 10,000× magnification.

TABLE 6

| Ex. | MU | Solvent | Resolution |
|---|---|---|---|
| 36 | Hafnium Carboxyethyl Acrylate | 1-Methoxy-2-propanol/n-Butanol | 5 µm |
| 37 | Zirconium Carboxyethyl Acrylate | 1-Methoxy-2-propanol/n-Propanol | 5 µm |
| 38 | Hafnium Carboxyethyl Acrylate/ Zirconium Carboxyethyl Acrylate | 1-Methoxy-2-propanol/n-Butanol/n-Propanol | 5 µm |

TABLE 6-continued

| Ex. | MU | Solvent | Resolution |
|---|---|---|---|
| 39 | Zirconium 6-(2-naphthylthio) bicyclo[2.2.1] heptane-2-carboxylate triacrylate | 1-Methoxy-2-propanol | 5 µm |
| 40 | Zirconium Carboxyethyl Acrylate Acryl-terminated POSS | 1-Methoxy-2-propanol/n-propanol | 5 µm |

The term resolution as used on Table 6 refers to the smallest feature size on the mask that can be printed on the substrate. In this particular case, 5 µm was the smallest feature size available on the photomask used for the purpose of generating these examples. It is expected that smaller than 5 µm size features can be printed by using appropriate mask and wavelength of the actinic radiation used. Examples 36-40 show that the process of applying a photosensitive metal-containing composition on silicon, drying the photosensitive metal-containing composition, exposing the photosensitive metal-containing composition to UV light through a mask and developing the unexposed portions of the composition with solvent successfully produces metal-containing three-dimensional objects.

Examples 36 and 37 were post-treated at 400° C. for 60 minutes. The patterned features were retained as seen under microscope showing that the process of applying a photosensitive metal-containing composition on silicon, drying the photosensitive metal-containing composition, exposing the photosensitive metal-containing composition to UV light through a mask and developing the unexposed portions of the composition with solvent and applying a thermal treatment successfully produces metal-containing three-dimensional objects.

What is claimed is:

1. A process of forming a metal-containing film, article or object comprising:
   a. applying a photosensitive metal-containing composition on a substrate wherein the photosensitive metal-containing composition comprises:
      i. a metal-containing precursor unit (MU) containing at least two reactive functional groups, and
      ii. a photoinitiator or photoactive catalyst where MU is represented by Structure I:

  Structure I where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; Ligand A contains a reactive functional group capable of undergoing a combining reaction; w is 2 to 7; Ligands B and C are selected individually or in combination from oxygen, nitrogen, sulfur, or a halogen atom; linear, branched or cyclic alkyl, alkenyl or alkynyl group; substituted or unsubstituted aryl group; and —$XR^1$ where X represents an organic functional group such as oxy, thio, carboxy, thiocarboxy, sulfo, oxalate, acetoacetonate, carbanion, carbonyl, thiocarbonyl, cyano, nitro, nitrito, nitrate, nitrosyl, azide, cyanato, isocyanato, thiocyanato, isothiocyanato, amido, amine, diamine, arsine, diarsine, phosphine, and diphosphine, and $R^1$ represents a linear, branched or cyclic alkyl or thioalkyl group, a heterocyclic group, an alicyclic group, and a substituted or unsubstituted aryl or heteroaryl group; and x and y are 0 to 5,
   b. drying the photosensitive metal-containing composition
   c. exposing the photosensitive metal-containing composition to a source of actinic radiation and
   d. after c applying a post-treatment to the metal-containing composition.

2. The process of claim 1 wherein the post-treatment is thermal.

3. The process of claim 2 wherein the thermal treatment is at a temperature of 200° C. or more.

4. The process of claim 1 wherein, in c, the photosensitive metal-containing composition is exposed through a mask or a mold followed by development of the unexposed portion of the composition.

5. The process of claim 4 wherein the unexposed portion of the composition is developed with a solvent based developer.

6. The process of claim 5 wherein the unexposed portion of the composition is developed with at least one member selected selected individually or in combination from the group 1-methoxy-2-propyl acetate, 2-butanone, n-butanol, n-propanol, and acetone.

7. The process of claim 4, wherein after d, the composition comprises $M_zE_v$ where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine; where z is about 5 to about 95% and z+v is 100.

8. The process of claim 4, wherein the composition formed by the process is contained in a microdevice.

9. The process of claim 4 wherein the unexposed portion of the composition is developed with at least one member selected individually or in combination from the group aqueous alkaline and aqueous acidic developer.

10. The process of claim 4, wherein, after d, the metal-containing composition has a dielectric constant of at least 2.

11. The process of claim 4, wherein the photoinitiator or photoactive catalyst is selected based on sensitivity to exposure wavelength.

12. The process of claim 4, wherein, after d, the metal containing composition has an index of refraction in the range of 1.5 to 2.2 in the 400-900 nm range of light and 1.5 to 2.4 in the 150-400 nm range of light.

13. The process of claim 8, wherein the microdevice comprises at least one member selected from the group consisting of integrated circuits, image sensors, microsensors, inkjet nozzles, flat panel displays, and laser diodes.

14. The process of claim 1, wherein Ligand A of the metal-containing precursor unit comprises at least one member selected from the group consisting of acrylate, methacrylate, styryl, vinyl, allyl, cyclo-olefin, SiH, SH, and epoxide.

15. The process of claim 1 wherein the photosensitive metal-containing composition further comprises a nanoparticle selected individually or in combination from surface treated or untreated silica, alumina, titania, zirconia, hafnia, CdSe, CdS, CdTe, CuO, zinc oxide, lanthanum oxide, niobium oxide, tungsten oxide, strontium oxide, calcium titanium oxide, sodium titanate, and potassium niobate.

16. The process of claim 1 wherein the photosensitive metal-containing composition further comprises a prepolymer unit, PU, which contains at least two reactive functional groups wherein reactive functional group comprises at least one member selected from the group consisting of acrylate, methacrylate, styryl, vinyl, allyl, cyclo-olefin, SiH, SH and epoxide.

17. The process of claim 16 wherein the prepolymer unit, PU, comprises at least one member selected from the group consisting urethane acrylate oligomer, urethane multi(meth)acrylate, multiurethane (meth)acrylate, multiurethane multi (meth)acrylate, 1,6-hexanediol di(meth)acrylate, tetraethyleneglycol di(meth)acrylate, divinylbenzene, ethoxylated bisphenol-A- di(meth)acrylate, diethylene glycol bis(allyl carbonate), trimethylolpropane tri(meth)acrylate, ditrimethylolpropane tetra(meth)acrylate, pentaerythritol tri(meth) acrylate, pentaerythritol tetra(meth)acrylate, dipentaerythritol penta-/hexa-(meth)acrylate, isocyanurate tri(meth) acrylate, bis(2-hydroxyethyl)-isocyanurate di(meth)acrylate, 1,3-butanediol di(meth)acrylate, 1,4-butanediol di(meth) acrylate, neopentyl glycol di(meth)acrylate, (meth)acrylate modified-urea-formaldehyde, melamine-formaldehyde, cellulose, vinyl-, epoxide- and (meth)acryl-terminated polyhedyrl oligomeric silsesquioxanes, vinyl-terminated polydimethylsiloxanes, vinyl terminated diphenylsiloxane-dimethylsiloxane copolymer, vinyl terminated polyphenylmethylsiloxane, vinyl terminated diethylsiloxane-dimethylsiloxane copolymer, vinylmethylsiloxane-dimethylsiloxane copolymers, trimethylsiloxy terminated, vinylmethylsiloxane-d imethylsiloxane copolymers, vinyl terminated, vinylmethylsiloxane-homopolymers, vinyl T-structured polymers, vinylmethylsiloxane terpolymers, vinylmethoxysiloxane homopolymer, vinylethoxysiloxane homopolymer, vinyl-propylethoxysiloxane copolymer, hydride terminated poly-dimethyl siloxanes, methylhydrosiloxane-dimethylsiloxane copolymers, trimethylsiloxy terminated, methylhydrosiloxane-dimethylsiloxane copolymers, hydride terminated, polymethylhydrosiloxanes, trimethylsiloxy terminated, polyethylhydrosiloxane, triethylsiloxy terminated, polyphenyl-(dimethylhydroxysiloxy)siloxane, hydride terminated and hydride Q resin.

18. The process of claim 1 wherein the photosensitive metal-containing composition further comprises a co-monomer with only one reactive functional group wherein reactive functional group comprises at least one member selected from the group consisting of acrylate, methacrylate, styryl, vinyl, allyl, cyclo-olefin, SiH, SH and epoxide.

19. The process of claim 1 wherein the photosensitive metal-containing composition further comprises a solvent.

20. The process of claim 1 wherein the photosensitive metal-containing composition further comprises an additive.

21. The process of claim 1, wherein after d the metal-containing composition comprises $M_zE_v$ where M comprises a metal with a formal valency of 0-7 and is selected from Zr, Hf, Ge, Ti, Pb, Gd, Sn, Zn, Ni, Ce, Nb, Eu, In, Al, Fe, Mn, Nd, Cu, Sb, Mg, Ga, Se, Cd, Ta, Co, Cr, Pt, Au, W, V, TI, Te, Sr, Sm, La, Er, Pd, In, Ca, Ba, As and Y; E is selected individually or in combination from a group of elements such as oxygen, hydrogen, nitrogen, sulfur, carbon, silicon or fluorine; and z is about 5 to about 95% and z+v is 100%.

22. The process of claim 1, wherein after d the metal containing composition has an index of refraction in the range of 1.5 to 2.2 in the 400-900 nm range of light and 1.5 to 2.4 in the 150-400 nm range of light.

23. The process of claim 1 wherein the metal-containing precursor unit (MU) comprises at least one member selected from the group consisting of zirconium (meth)acrylate, zirconyl di(meth)acrylate, zirconium butoxide (meth)acrylate, zirconium carboxyethyl acrylate, zirconium vinyl acetate, zirconyl di(vinyl acetate), hafnium (meth)acrylate, hafnium butoxide (meth)acrylate, hafnium oxide di(meth)acrylate, hafnium carboxyethyl acrylate, hafnium vinyl acetate, and hafnium oxide di(vinyl acetate), titanium (meth)acrylate, titanium butoxide (meth)acrylate, titanium oxide di(meth)acrylate, titanium carboxyethyl acrylate, titanium vinyl acetate, titanium oxide di(vinyl acetate), di-n-butoxydi(meth)acryloxygermane, tetracarboxyethylacryloxygermane, tetravinylacetoxygermane, tetra(meth)acryloxygermane, tantalum (meth)acrylate, tantalum butoxide (meth)acrylate, tantalum carboxyethyl acrylate, tantalum vinyl acetate, aluminum (meth)acrylate, aluminum butoxide (meth)acrylate, aluminum carboxyethyl acrylate, aluminum vinyl acetate, niobium (meth)acrylate, niobium butoxide (meth)acrylate, niobium carboxyethyl acrylate, niobium vinyl acetate.

24. The process of claim 1 wherein the metal-containing precursor unit (MU) comprises at least one member selected from the group consisting of zirconium vinyl acetate, zirconyl di(vinyl acetate), hafnium vinyl acetate, and hafnium oxide di(vinyl acetate) and further comprises a prepolymer unit, PU, which contains at least two reactive functional groups wherein the reactive functional group comprises at least one member selected from the group consisting of SiH and SH.

25. The process of claim 1 wherein Ligand A of the metal-containing precursor unit comprises at least one member selected from the group consisting of acrylate, methacrylate, styryl, vinyl, allyl, and cyclo-olefin and further comprises a prepolymer unit, PU, which contains at least two reactive functional groups wherein the reactive functional group comprises at least one member selected from the group consisting of SiH and SH.

26. The process of claim 1, wherein, after d, the metal-containing composition has a dielectric constant of at least 2.

27. The process of claim 1, wherein the photoinitiator or photoactive catalyst is selected based on sensitivity to exposure wavelength.

28. The process of claim 1, wherein the composition formed by the process is contained in a microdevice.

29. The process of claim 28, wherein the microdevice comprises at least one member selected from the group consisting of integrated circuits, image sensor, microsensors, inkjet nozzles, flat panel displays, and laser diodes.

30. A process of forming a metal-containing film or article comprising:
a. applying a metal-containing composition on a substrate wherein the metal-containing composition comprises:
i. a metal-containing precursor unit (MU), at least a portion of which contains at least two ethylenically unsaturated functional groups, and
ii. an initiator or catalyst where MU is represented by Structure I:

                                                                        Structure I $MA_wB_xC_y$ where M comprises a metal with a formal valency of 0-5 such as Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises

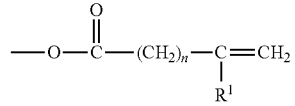
                                                                        Structure II where $R^1$ is a H atom, an alkyl group containing 1-8 carbon atoms, a group containing a halogen atom, or a hydroxyalkyl group, and n is 0-6;
B and C each comprise a member selected from the group consisting of oxygen, sulfur, a halogen atom and $-OR^3$ where $R^3$ represents an alkyl group, a halo-alkyl group, a substituted or unsubstituted aryl group;
w is 1-5, x is 0-4, y is 0-4, and w+x+y is 1-5,
b. drying the metal-containing composition
c. exposing the metal-containing composition to a source of actinic radiation and
d. after c applying a post-treatment to the metal-containing composition.

31. A process of forming a metal-containing film or article comprising:
a. applying a metal-containing composition on a substrate wherein the metal-containing composition comprises:
i. a metal-containing precursor unit (MU), at least a portion of which contains at least two ethylenically unsaturated functional groups, and
ii. an initiator or catalyst where MU is represented by Structure I:

Structure I $MA_wB_xC_y$ where M comprises a metal with a formal valency of 0-5 such as Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises

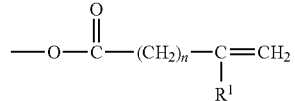
                                                                        Structure II where $R^1$ is a H atom, an alkyl group containing 1-8 carbon atoms, a group containing a halogen atom, or a hydroxyalkyl group, and n is 0-6;

B and C each comprise a member selected from the group consisting of oxygen, sulfur, a halogen atom and —$OR^3$ where $R^3$ represents an alkyl group, a halo-alkyl group, a substituted or unsubstituted aryl group;

w is 1-5, x is 0-4, y is 0-4, and w+x+y is 1-5, b. drying the metal-containing composition c. exposing the metal-containing composition to a source of actinic radiation and d. after c applying a post-curing bake to the metal-containing composition.

32. The process of claim 31, wherein, after c, the metal containing composition has an index of refraction in the range of 1.5 to 2.2 in the 400-900 nm range of light and 1.5 to 2.4 in the 150-400 nm range of light.

33. A process of forming a metal-containing film or article comprising:

a. applying a metal-containing composition on a substrate wherein the metal-containing composition comprises:

i. a metal-containing precursor unit (MU), at least a portion of which contains at least two ethylenically unsaturated functional groups, and ii. an initiator or catalyst where MU is represented by Structure I:

$$MA_wB_xC_y \qquad \text{Structure I}$$

where M comprises a metal with a formal valency of 0-5 such as Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises

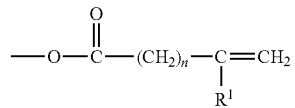

Structure II where $R^1$ is a H atom, an alkyl group containing 1-8 carbon atoms, a group containing a halogen atom, or a hydroxyalkyl group, and n is 0-6;

B and C each comprise a member selected from the group consisting of oxygen, sulfur, a halogen atom and —$OR^3$ where $R^3$ represents an alkyl group, a halo-alkyl group, a substituted or unsubstituted aryl group;

w is 1-5, x is 0-4, y is 0-4, and w+x+y is 1-5, b. drying the metal-containing composition, and c. heating the composition to a temperature in the range of about 50° C. to 300 ° C. for a period of time in the range of about 5 seconds to 30 minutes in order to cure the composition.

34. The process of claim 33, wherein the initiator comprises at least one member selected from the group consisting of benzoyl peroxides and azo compounds.

* * * * *